US012277916B2

(12) United States Patent
Park et al.

(10) Patent No.: US 12,277,916 B2
(45) Date of Patent: Apr. 15, 2025

(54) DATA COMPENSATING CIRCUIT, DISPLAY DEVICE INCLUDING THE SAME, AND METHOD OF COMPENSATING DATA USING THE SAME

(71) Applicant: Samsung Display Co., Ltd., Yongin-Si (KR)

(72) Inventors: Jong-Woong Park, Seongnam-si (KR); Suk Hoon Ku, Seoul (KR); Seok Jeong Song, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/493,097

(22) Filed: Oct. 4, 2021

(65) Prior Publication Data

US 2022/0108667 A1 Apr. 7, 2022

(30) Foreign Application Priority Data

Oct. 6, 2020 (KR) ........................ 10-2020-0128862
Aug. 23, 2021 (KR) ........................ 10-2021-0111174

(51) Int. Cl.
*G09G 5/10* (2006.01)
*G09G 3/3275* (2016.01)

(52) U.S. Cl.
CPC ............. *G09G 5/10* (2013.01); *G09G 3/3275* (2013.01); *G09G 2310/08* (2013.01); *G09G 2320/0257* (2013.01); *G09G 2320/0646* (2013.01)

(58) Field of Classification Search
None
See application file for complete search history.

(56) References Cited

U.S. PATENT DOCUMENTS

| | | | | |
|---|---|---|---|---|
| 7,675,492 B2 | 3/2010 | Park et al. | | |
| 10,354,575 B2 | 7/2019 | Yang et al. | | |
| 2006/0279490 A1* | 12/2006 | Park | G09G 3/2092 | 345/76 |
| 2007/0164946 A1* | 7/2007 | Akutsu | G09G 3/36 | 345/87 |

FOREIGN PATENT DOCUMENTS

KR 1020180032720 A 4/2018

* cited by examiner

*Primary Examiner* — Andre L Matthews
(74) *Attorney, Agent, or Firm* — CANTOR COLBURN LLP

(57) ABSTRACT

A data compensation circuit includes a reference frame memory device which stores reference frame data, an accumulated stress memory device which stores cumulative stress data for each of pixels, a stress data generating block which compares output image data with the reference frame data to generate stress data for each of the pixels, a memory control block which adds the stress data to the cumulative stress data to update the cumulative stress data and a compensating block which generates the output image data by generating afterimage compensation data for each of the pixels based on the cumulative stress data and compensating input image data based on the afterimage compensation data.

15 Claims, 10 Drawing Sheets

DATA COMPENSATING CIRCUIT, DISPLAY DEVICE INCLUDING THE SAME, AND METHOD OF COMPENSATING DATA USING THE SAME

This application claims priority to Korean Patent Application No. 10-2020-0128862 filed on Oct. 6, 2020 and Korean Patent Application No. 10-2021-0111174 filed on Aug. 23, 2021, and all the benefits accruing therefrom under 35 U.S.C. § 119, the content of which in its entirety is herein incorporated by reference.

BACKGROUND

1. Field

Embodiments of the invention relate to a data compensating circuit. More specifically embodiments of the invention relate to a data compensating circuit for performing a momentary afterimage compensation, a display device including the same, a method of compensating data using the same.

2. Description of the Related Art

A display device may display an image by a plurality of pixels included in the display device. Each of the pixels may include a plurality of transistors including a driving transistor, and a light emitting device electrically connected to the transistors. The driving transistor included in each pixel may generate a driving current, and the light emitting device included in each pixel may emit light with a luminance corresponding to a magnitude of the driving current. However, a voltage-current characteristics of the driving transistor may vary according to an operating state of the driving transistor in the previous display frame. In other words, the driving transistors included in the pixels may have hysteresis.

SUMMARY

When display areas of a display device are driven with different gray scales in the previous display frames, a momentary afterimage may occur in which the display areas emit light with different luminance for a predetermined period of time due to the hysteresis of the driving transistor, even when being driven with the same gray scale in next display frames.

Embodiments of the invention provide a data compensation circuit capable of reducing a user's visual recognition of a luminance difference by reducing a momentary afterimage of each pixel.

Embodiments of the invention also provide a display device including the data compensation circuit and capable of reducing a user's visual recognition of a luminance difference by reducing a momentary afterimage of each pixel inside a display panel.

Embodiments of the invention also provide a method of compensating data capable of reducing a user's visual recognition of a luminance difference by reducing a momentary afterimage of each pixel.

In an embodiment of a data compensation circuit for pixels according to the invention, a data compensation circuit includes a reference frame memory device which stores reference frame data, an accumulated stress memory device which stores cumulative stress data for each of the pixels, a stress data generating block which compares output image data with the reference frame data to generate stress data for each of the pixels, a memory control block which adds the stress data to the cumulative stress data to update the cumulative stress data and a compensating block which generates the output image data by generating afterimage compensation data for each of the pixels based on the cumulative stress data and compensating input image data based on the afterimage compensation data.

In an embodiment, the stress data generating block may generate the stress data by calculating a stress for each of the pixels based on a difference between a first gray scale value according to the output image data and a reference gray scale value according to the reference frame data.

In an embodiment, the stress data may be calculated by Equation 1:

$$SD=A1*[(-\mathrm{MaxStress}/\mathrm{ZeroSt}X)*A0*DDO+\mathrm{MaxStress}],$$

where SD represents the stress data, A0 and A1 represent stress correction factors, DDO represents the difference between the first gray scale value and the reference gray scale value, MaxStress represents a maximum value of the stress, and ZeroStX represents a value of the DDO when the stress is 0.

In an embodiment, the stress data may have a maximum value when the first gray scale value and the reference gray scale value have values equal to each other, and is decreases as the difference between the first gray scale value and the reference gray scale value is increased.

In an embodiment, the cumulative stress data may be increased in proportion to a time duration during which the difference between the first gray scale value and the reference gray scale value is maintained.

In an embodiment, the compensating block may determine a luminance compensation amount of the afterimage compensation data based on the cumulative stress data and a difference between the reference gray scale value and the second gray scale value according to the input image data.

In an embodiment, when the second gray scale value is greater than the reference gray scale value, the compensating block may generate the afterimage compensation data that performs a compensation of decreasing a luminance of the input image data.

In an embodiment, when the second gray scale value is smaller than the reference gray scale value, the compensating block may generate the afterimage compensation data that performs a compensation of increasing a luminance of the input image data.

In an embodiment, when a size of the luminance compensation amount of the afterimage compensation data becomes 0, the compensating block may update the reference frame data as the input image data.

In an embodiment, the stress data generating block may calculate a luminance correction constant by reflecting luminance data of the input image data, and generate luminance correction stress data based on the luminance correction constant.

In an embodiment of a display device according to the invention, a display device includes a display panel including pixels, a data driving circuit which provides a data signal to the display panel, a scan driving circuit which provides a scan signal to the display panel, a data compensation circuit which compensates input image data to generate output image data corresponding to the data signal and a timing control circuit which controls the data driving circuit, the scan driving circuit, and the data compensation circuit. Here, the data compensation circuit includes a reference frame memory device which stores reference frame data, an accumulated stress memory device which stores cumulative stress data for each of the pixels, a stress data generating block which compares output image data with the reference frame data to generate stress data for each of the pixels, a memory control block which adds the stress data to the cumulative stress data to update the cumulative stress data and a compensating block which generates the output image data by generating afterimage compensation data for each of the pixels based on the cumulative stress data and compensating the input image data based on the afterimage compensation data.

In an embodiment, the stress data generating block may generate the stress data by calculating a stress for each of the pixels based on a difference between a first gray scale value according to the output image data and a reference gray scale value according to the reference frame data.

In an embodiment, the stress data may have a maximum value when the first gray scale value and the reference gray scale value have values equal to each other, and is decreases as the difference between the first gray scale value and the reference gray scale value is increased.

In an embodiment, the cumulative stress data may be increased in proportion to a time duration during which the difference between the first gray scale value and the reference gray scale value is maintained.

In an embodiment, the compensating block may determine a luminance compensation amount of the afterimage compensation data based on the cumulative stress data and a difference between the reference gray scale value and the second gray scale value according to the input image data.

In an embodiment, when a size of the luminance compensation amount of the afterimage compensation data becomes 0, the compensating block may update the reference frame data as the input image data.

In an embodiment, the stress data generating block may calculate a luminance correction constant by reflecting luminance data of the input image data, and generate luminance correction stress data based on the luminance correction constant.

In an embodiment of a method of compensating data according to the invention, the method may include storing reference frame data, storing cumulative stress data for each of pixels, comparing output image data with the reference frame data to generate stress data for each of the pixels, adding the stress data to the cumulative stress data to update the cumulative stress data, generating afterimage compensation data for each of the pixels based on the cumulative stress data and generating the output image data by compensating a luminance of the input image data based on the afterimage compensation data.

In an embodiment, the generating the stress data includes calculating a stress for each of the pixels based on a difference between a first gray scale value according to the output image data and a reference gray scale value according to the reference frame data.

In an embodiment, the generating the afterimage compensation data may include determining a luminance compensation amount of the afterimage compensation data based on the cumulative stress data and a difference between the reference gray scale value and the second gray scale value according to the input image data and updating the reference frame data as the input image data when a size of the luminance compensation amount of the afterimage compensation data becomes 0.

In an embodiment of a data compensation circuit for pixels according to the invention, a data compensation circuit includes a reference frame data generating block which generates (i)th reference frame data, where i is an integer greater than or equal to 2, based on (i−1)th reference frame data that is generated in an (i−1)th display frame and (i)th output image data that is generated based on the (i−1)th reference frame data in an (i)th display frame, a reference frame memory device which stores the (i)th reference frame data when the (i)th reference frame data is generated in the (i)th display frame and provides the (i)th reference frame data in an (i+1)th display frame, a memory control block which controls the reference frame memory device, and a compensating block which generates the (i)th output image data by generating (i)th conversion image data based on (i)th input image data that is input in the (i)th display frame, by generating afterimage compensation data for each of the pixels based on the (i)th conversion image data and the (i−1)th reference frame data, and by compensating the (i)th input image data based on the afterimage compensation data.

In an embodiments, the (i)th conversion image data may be calculated by Equation 2:

$$CND[i]=M1*\mathrm{IND}[i],$$

where CND[i] represents the (i)th conversion image data, IND[i] represents the (i)th input image data, and M1 represents a data correction factor.

In an embodiment, the (i)th reference frame data may be calculated by Equation 3:

$$\mathrm{RFD}[i]=M2*\mathrm{RFD}[i-1]+M3*\mathrm{OUTD}[i],$$

where RFD[i] represents the (i)th reference frame data that is generated in the (i)th display frame, RFD[i−1] represents the (i−1)th reference frame data that is generated in the (i−1)th display frame, OUTD[i] represents the (i)th output image data that is generated in the (i)th display frame, M2 represents a cumulative correction factor, and M3 represents a luminance correction factor.

In an embodiment, the compensating block may determine a luminance compensation amount of the afterimage compensation data based on a difference between a reference gray scale value according to the (i−1)th reference frame data and a gray scale value according to the (i)th conversion image data.

In an embodiment, when the gray scale value is greater than the reference gray scale value, the compensating block may generate the afterimage compensation data which performs a compensation of decreasing a luminance of the (i)th input image data. In addition, when the gray scale value is smaller than the reference gray scale value, the compensating block may generate the afterimage compensation data which performs a compensation of increasing the luminance of the (i)th input image data. Further, when the gray scale value is equal to the reference gray scale value, the compensating block may generate the afterimage compensation data which does not perform a compensation of adjusting the luminance of the (i)th input image data.

In an embodiment, the afterimage compensation data may be generated by Equations 4 to 6:

$$\mathrm{CD}[i]=B*\mathrm{MaxComp}N*DDI[i],\ DDI[i]>0,$$

$$\mathrm{CD}[i]=C*\mathrm{MaxComp}P*DDI[i],\ DDI[i]<0,\ \text{and}$$

$$\mathrm{CD}[i]=0,\ DDI[i]=0,$$

where CD[i] represents the afterimage compensation data, DDI[i] represents the difference between the reference gray scale value according to the (i−1)th reference frame data and the gray scale value according to the (i)th conversion image data, MaxcompN represents a maximum value of the afterimage compensation data when DDI[i]>0, MaxcompP represents a maximum value of the afterimage compensation data when DDI[i]<0, B represents an afterimage compensation correction factor when DDI[i]>0, and C represents an afterimage compensation correction factor when DDI[i]<0.

In an embodiment of a display device according to the invention, a display device includes a display panel including pixels, a data driving circuit which provides a data signal to the display panel, a scan driving circuit which provides a scan signal to the display panel, a data compensation circuit which compensates input image data and generates output image data corresponding to the data signal, and a timing control circuit which controls the data driving circuit, the scan driving circuit, and the data compensation circuit. Here, the data compensation circuit includes a reference frame data generating block which generates (i)th reference frame data, where i is an integer greater than or equal to 2, based on (i−1)th reference frame data that is generated in an (i−1)th display frame and (i)th output image data that is generated based on the (i−1)th reference frame data in an (i)th display frame, a reference frame memory device which stores the (i)th reference frame data when the (i)th reference frame data is generated in the (i)th display frame and provides the (i)th reference frame data in an (i+1)th display frame, a memory control block which controls the reference frame memory device, and a compensating block which generates the (i)th output image data by generating (i)th conversion image data based on (i)th input image data that is input in the (i)th display frame, by generating afterimage compensation data for each of the pixels based on the (i)th conversion image data and the (i−1)th reference frame data, and by compensating the (i)th input image data based on the afterimage compensation data;

In an embodiment, the (i)th conversion image data may be calculated by Equation 2:

$$CND[i]=M1*\mathrm{IND}[i],$$

where CND[i] represents the (i)th conversion image data, IND[i] represents the (i)th input image data, and M1 represents a data correction factor.

In an embodiment, the (i)th reference frame data may be calculated by Equation 3:

$$\mathrm{RFD}[i]=M2*\mathrm{RFD}[i-1]+M3*\mathrm{OUTD}[i],$$

where RFD[i] represents the (i)th reference frame data that is generated in the (i)th display frame, RFD[i−1] represents the (i−1)th reference frame data that is generated in the (i−1)th display frame, OUTD[i] represents the (i)th output image data that is generated in the (i)th display frame, M2 represents a cumulative correction factor, and M3 represents a luminance correction factor.

In an embodiment, the afterimage compensation data may be generated by Equations 4 to 6:

$$\mathrm{CD}[i]=B*\mathrm{MaxComp}N*DDI[i],\ DDI[i]>0,$$

$$\mathrm{CD}[i]=C*\mathrm{MaxComp}P*DDI[i],\ DDI[i]<0,\ \text{and}$$

$$\mathrm{CD}[i]=0,\ DDI[i]=0,$$

where CD[i] represents the afterimage compensation data, DDI[i] represents the difference between the reference gray scale value according to the (i−1)th reference frame data and a gray scale value according to the (i)th conversion image data, MaxcompN represents a maximum value of the afterimage compensation data when DDI[i]>0, MaxcompP represents a maximum value of the afterimage compensation data when DDI[i]<0, B represents an afterimage compensation correction factor when DDI[i]>0, and C represents an afterimage compensation correction factor when DDI[i]<0.

Therefore, a data compensation circuit 1) may include a reference frame memory device which stores reference frame data, an accumulated stress memory device which stores cumulative stress data for each of the pixels, a stress data generating block which compares output image data with the reference frame data to generate stress data for each of the pixels, a memory control block which adds the stress data to the cumulative stress data to update the cumulative stress data and a compensating block which generates the output image data by generating afterimage compensation data for each of the pixels based on the cumulative stress data and compensating input image data based on the afterimage compensation data or 2) may include a reference frame data generating block which generates (i)th reference frame data, where i is an integer greater than or equal to 2, based on (i−1)th reference frame data that is generated in an (i−1)th display frame and (i)th output image data that is generated based on the (i−1)th reference frame data in an (i)th display frame, a reference frame memory device which stores the (i)th reference frame data when the (i)th reference frame data is generated in the (i)th display frame and provides the (i)th reference frame data in an (i+1)th display frame, a memory control block which controls the reference frame memory device, and a compensating block which generates the (i)th output image data by generating (i)th conversion image data based on (i)th input image data that is input in the (i)th display frame, by generating afterimage compensation data for each of the pixels based on the (i)th conversion image data and the (i−1)th reference frame data, and by compensating the (i)th input image data based on the afterimage compensation data. Thus, the data compensation circuit may improve hysteresis of a first transistor included in each pixel through the above data compensation, and accordingly, the momentary afterimage of the display device due to the hysteresis of the first transistor may be improved.

In addition, the display device in the embodiments of the invention may include the data compensation circuits, so that the hysteresis of the first transistor included in each pixel may be improved, and accordingly, the momentary afterimage of the display device due to the hysteresis of the first transistor may be improved.

BRIEF DESCRIPTION OF THE DRAWINGS

The above and other embodiments, advantages and features of this disclosure will become more apparent by describing in further detail embodiments thereof with reference to the accompanying drawings.

DETAILED DESCRIPTION

Figure 1:
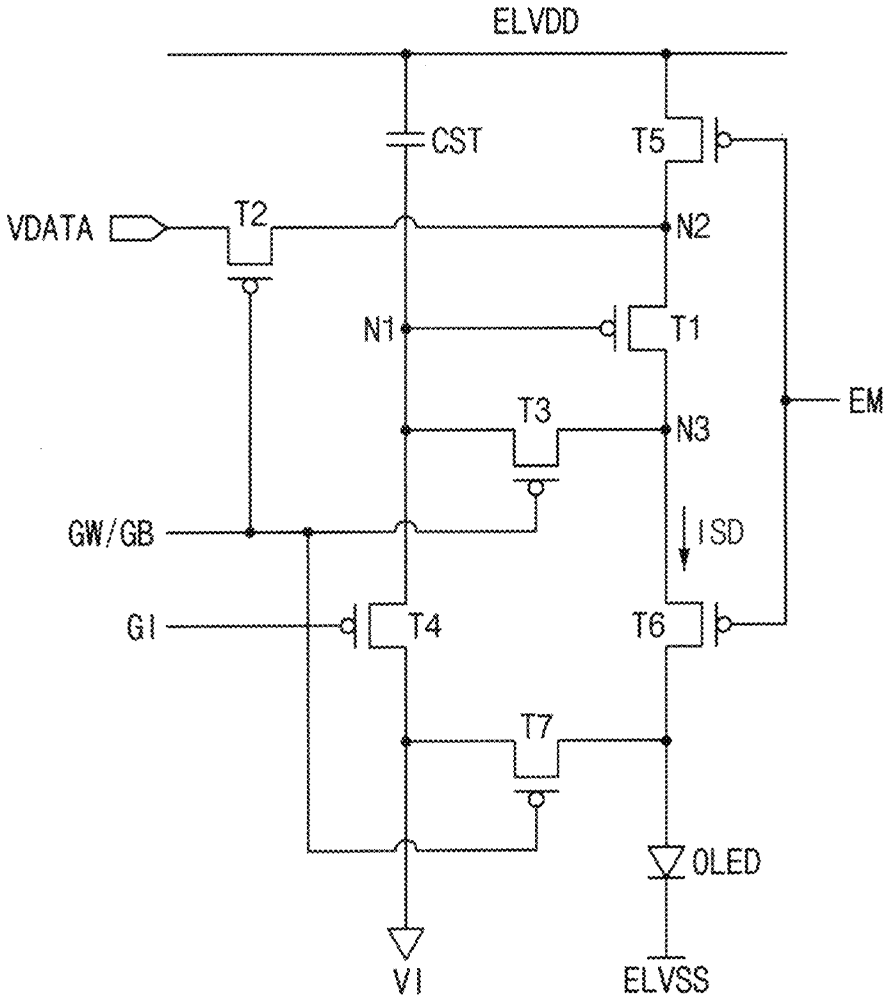
FIG. 1 is a circuit diagram illustrating a pixel.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. Terms such as "device" and "block" may refer to a circuit or processor, for example.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
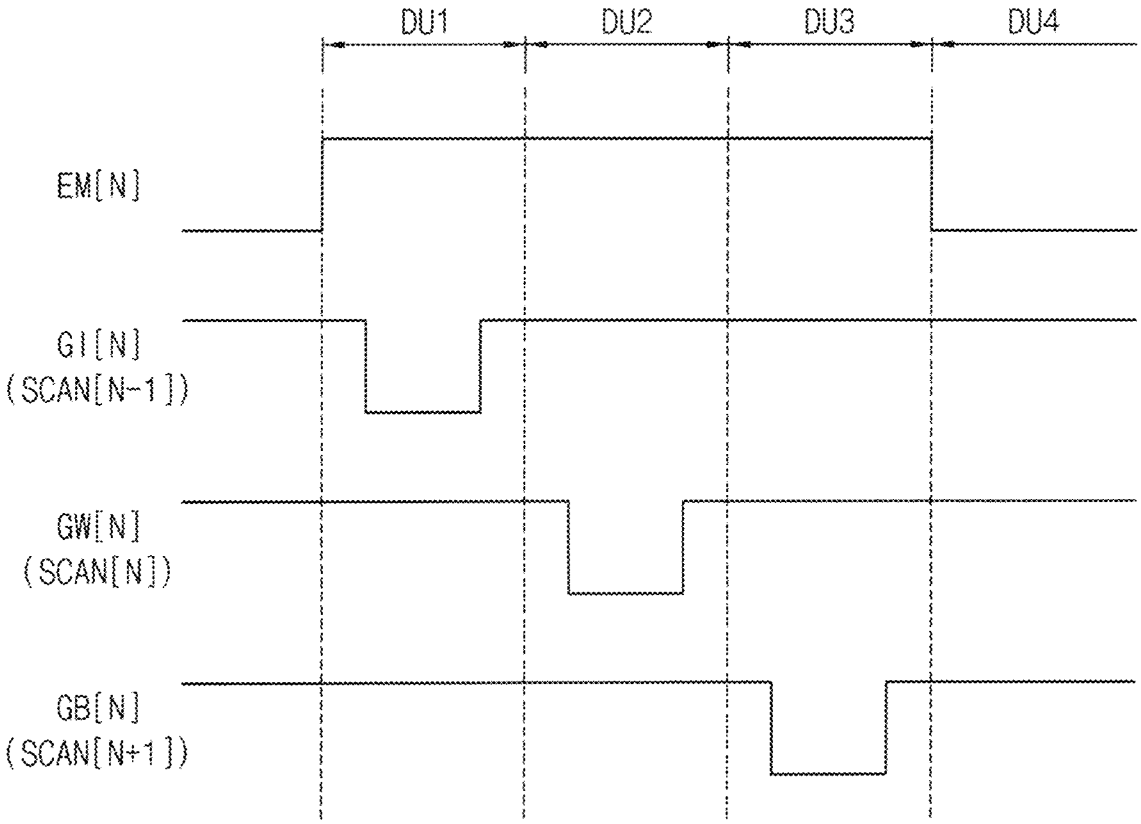
FIG. 2 is a timing diagram illustrating input signals applied to the pixel of FIG. 1.

FIG. 1 is a circuit diagram illustrating a pixel. FIG. 2 is a timing diagram illustrating input signals applied to the pixel of FIG. 1.

Referring to FIGS. 1 and 2, each of a plurality of pixels may include an organic light emitting element OLED.

The pixels may receive a data write gate signal GW, a data initialization gate signal GI, an organic light emitting device initialization gate signal GB, a data voltage VDATA, and an emission signal EM, and emit the organic light emitting element OLED according to a level of the data voltage VDATA, so that an image may be displayed.

At least one of the pixels may include first to seventh transistors T1 to T7, a storage capacitor CST, and an organic light emitting element OLED.

The first transistor T1 may include a control electrode connected to a first node N1, a first electrode (or input electrode) connected to a second node N2, and a second electrode (or output electrode) connected to a third node N3.

In an embodiment, the first transistor T1 may be a P-type thin film transistor ("TFT"), for example. The control electrode of the first transistor T1 may be a gate electrode, the input electrode of the first transistor T1 may be a source electrode, and the output electrode of the first transistor T1 may be a drain electrode.

The second transistor T2 may include a control electrode to which the data write gate signal GW is applied, a first electrode (or input electrode) to which the data voltage VDATA is applied, and a second electrode (or output electrode) connected to the second node N2.

In an embodiment, the second transistor T2 may be a P-type TFT, for example. The control electrode of the second transistor T2 may be a gate electrode, the input electrode of the second transistor T2 may be a source electrode, and the output electrode of the second transistor T2 may be a drain electrode.

The third transistor T3 may include a control electrode to which the data write gate signal GW is applied, a first electrode (or input electrode) connected to the first node N1, and a second electrode (or output electrode) connected to the third node N3.

In an embodiment, the third transistor T3 may be a P-type TFT, for example. The control electrode of the third transistor T3 may be a gate electrode, the input electrode of the third transistor T3 may be a source electrode, and the output electrode of the third transistor T3 may be a drain electrode.

The fourth transistor T4 may include a control electrode to which the data initialization gate signal GI is applied, a first electrode (or input electrode) to which an initialization signal VI is applied, and a second electrode (or output electrode) connected to the first node N1.

In an embodiment, the fourth transistor T4 may be a P-type TFT, for example. The control electrode of the fourth transistor T4 may be a gate electrode, the input electrode of the fourth transistor T4 may be a source electrode, and the output electrode of the fourth transistor T4 may be a drain electrode.

The fifth transistor T5 may include a control electrode to which the emission signal EM is applied, a first electrode (or input electrode) to which a high power voltage ELVDD is applied, and a second electrode (or output electrode) connected to the second node N2.

In an embodiment, the fifth transistor T5 may be a P-type TFT, for example. The control electrode of the fifth transistor T5 may be a gate electrode, the input electrode of the fifth transistor T5 may be a source electrode, and the output electrode of the fifth transistor T5 may be a drain electrode.

The sixth transistor T6 may include a control electrode to which the emission signal EM is applied, a first electrode (or input electrode) connected to the third node N3, and a second electrode (or output electrode) connected to an anode electrode of the organic light emitting element OLED.

In an embodiment, the sixth transistor T6 may be a P-type TFT, for example. The control electrode of the sixth transistor T6 may be a gate electrode, the input electrode of the sixth transistor T6 may be a source electrode, and the output electrode of the sixth transistor T6 may be a drain electrode.

The seventh transistor T7 may include a control electrode to which the organic light emitting device initialization gate signal GB is applied, a first electrode (or input electrode) to which the initialization signal VI is applied, and a second electrode (or output electrode) connected to the anode electrode of the organic light emitting device.

In an embodiment, the seventh transistor T7 may be a P-type TFT, for example. The control electrode of the seventh transistor T7 may be a gate electrode, the input electrode of the seventh transistor T7 may be a source electrode, and the output electrode of the seventh transistor T7 may be a drain electrode.

The first to seventh transistors T1, T2, T3, T4, T5, T6, and T7 may be the same type of transistor. As mentioned above, each of the first to seventh transistors T1, T2, T3, T4, T5, T6, and T7 may be a P-type TFT. However, the invention is not limited thereto. In another embodiment, each of the first to seventh transistors T1, T2, T3, T4, T5, T6, and T7 may be an N-type TFT.

The storage capacitor CST may include a first electrode to which the high power voltage ELVDD is applied, and a second electrode connected to the first node N1.

The organic light emitting element OLED may include an anode electrode and a cathode electrode. A low power supply voltage ELVSS is applied to the cathode electrode of the organic light emitting element OLED.

Referring to FIG. 2, during a first section DU1, the first node N1 and the storage capacitor CST are initialized by the data initialization gate signal GI. During a second section DU2, a threshold voltage |VTH| of the first transistor T1 is compensated by the data write gate signal GW, and the data voltage VDATA in which the threshold voltage |VTH| is compensated is written to the first node N1. During a third section DU3, the anode electrode of the organic light emitting element OLED is initialized by the organic light emitting device initialization gate signal GB. During a fourth section DU4, the organic light emitting element OLED emits light by the emission signal EM, so that the display panel (e.g., 610 in FIG. 8) may display an image.

The data initialization gate signal GI may have an activation level in the first section DU1. In an embodiment, the activation level of the data initialization gate signal GI may be a low level, for example. When the data initialization gate signal GI has the activation level, the fourth transistor T4 is turned on, so that the initialization signal VI may be applied to the first node N1. The data initialization gate signal GI[N] of the current stage may be a scan signal SCAN[N−1] of the previous stage.

In the second section DU2, the data write gate signal GW may have an activation level. In an embodiment, the activation level of the data write gate signal GW may be a low level, for example. When the data write gate signal GW has the activation level, the second transistor T2 and the third transistor T3 are turned on. In addition, the first transistor T1 is also turned on by the initialization signal VI. The data write gate signal GW[N] of the current stage may be a scan signal SCAN[N] of the current stage.

A voltage obtained by subtracting the data voltage VDATA by an absolute value |VTH| of the threshold voltage of the first transistor T1 may be set to the first node N1 along a path formed by the turned-on first to third transistors T1, T2 and T3.

In the third section DU3, the organic light emitting device initialization gate signal GB may have an activation level. In an embodiment, the activation level of the organic light emitting device initialization gate signal GB may be a low level, for example. When the organic light emitting device initialization gate signal GB has the activation level, the seventh transistor T7 is turned on, so that the initialization signal VI may be applied to the anode electrode of the organic light emitting element OLED. The organic light emitting device initialization gate signal GB[N] of the current stage may be a scan signal SCAN[N+1] of the next stage.

In the fourth section DU4, the emission signal EM may have an activation level. In an embodiment, the activation level of the emission signal EM may be a low level, for example. When the emission signal EM has the active level, the fifth transistor T5 and the sixth transistor T6 are turned on. In addition, the first transistor T1 is also turned on by the data voltage VDATA.

The driving current may sequentially flow to the fifth transistor T5, the first transistor T1, and the sixth transistor T6 to drive the organic light emitting element OLED. The intensity of the driving current may be determined by the level of the data voltage VDATA. The luminance of the organic light emitting element OLED may be determined by the intensity of the driving current. A driving current ISD flowing along a path formed from the input electrode to the output electrode of the first transistor T1 may be expressed as Equation 1 below.

$$ISD = \frac{1}{2}\mu Cox\frac{W}{L}(VSG - |VTH|)^2 \quad \text{[Equation 1]}$$

In Equation 1, p is the mobility of the first transistor T1, Cox is the capacitance per unit area of the first transistor T1, W/L represents the ratio of a width and a length of the first transistor T1, VSG refers to a voltage between the input electrode N2 and the control electrode N1 of the first transistor T1, and |VTH| refers to the threshold voltage of the first transistor T1.

A voltage VG of the first node N1 in which the threshold voltage |VTH| is compensated in the second section DU2 may be expressed as Equation 2.

$$VG = VDATA - |VTH| \quad \text{[Equation 2]}$$

When the organic light emitting element OLED emits light in the fourth section DU4, a driving voltage VOV and a driving current ISD may be expressed as Equations 3 and 4 below. In Equation 3, VS refers to a voltage of the second node N2.

$$VOV = VS - VG - |VTH| = ELVDD - (VDATA - |VTH|) - |VTH| = ELVDD - VDATA \quad \text{[Equation 3]}$$

$$ISD = \frac{1}{2}\mu Cox\frac{W}{L}(ELVDD - VDATA)^2 \quad \text{[Equation 4]}$$

Since the threshold voltage |VTH| is compensated in the second section DU2, the driving current ISD may be determined regardless of a component of the threshold voltage |VTH| of the first transistor T1 when the organic light emitting element OLED emits light in the fourth section DU4.

Accordingly, the first transistor T1 included in each pixel may allow the driving current to flow, and the organic light emitting element OLED included in each pixel may emit light having a luminance corresponding to the magnitude of the driving current. The voltage-current characteristics of the first transistor T1 may vary according to an operating state of the first transistor T1 in the previous display frame. In other words, the first transistors T1 included in the pixels may have hysteresis.

Due to the hysteresis of the first transistor T1, when pixels of the display panel are driven with different gray scales in the previous display frames, a momentary afterimage may occur in which the pixels emit light with different luminance for a predetermined period of time, even when being driven with the same gray scale in the next display frames. The momentary afterimage may be improved by reducing a difference in luminance between pixels through data compensation. Hereinafter, the data compensation circuit for improving the momentary afterimage according to the invention will be described.

Figure 3:
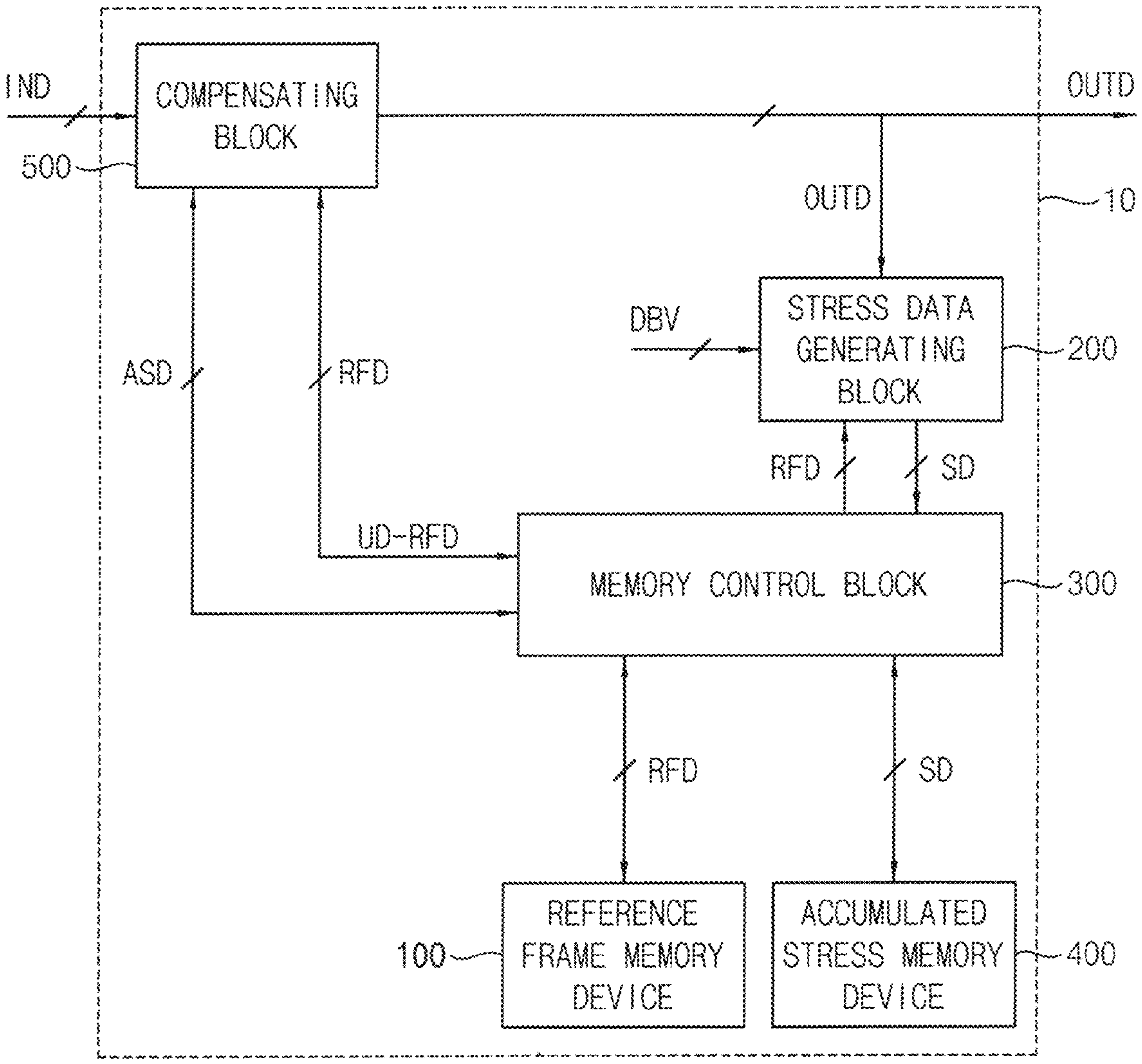
FIG. 3 is a block diagram illustrating an embodiment of a data compensation circuit according to the invention.
Figure 4A:
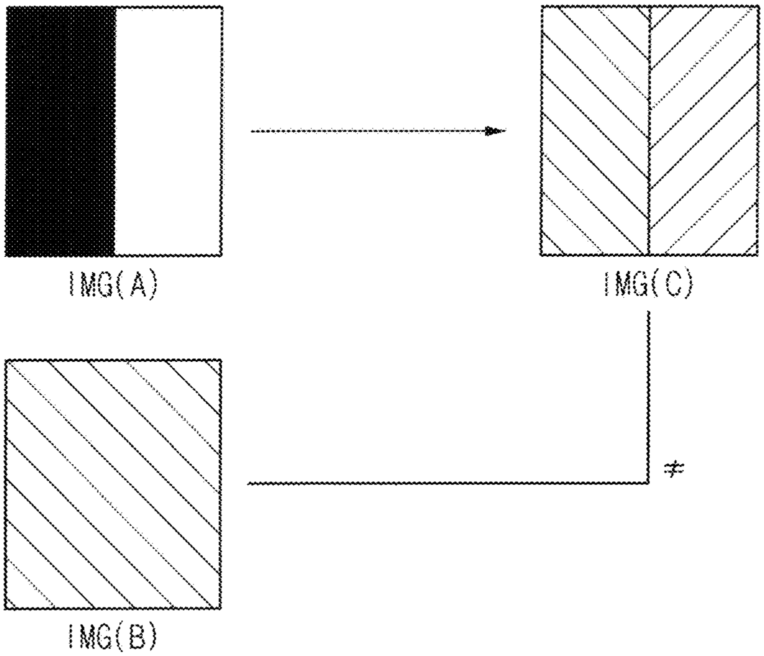
FIGS. 4A and 4B are diagrams for comparing before and after data compensation of the data compensation circuit of FIG. 3.
Figure 4B:
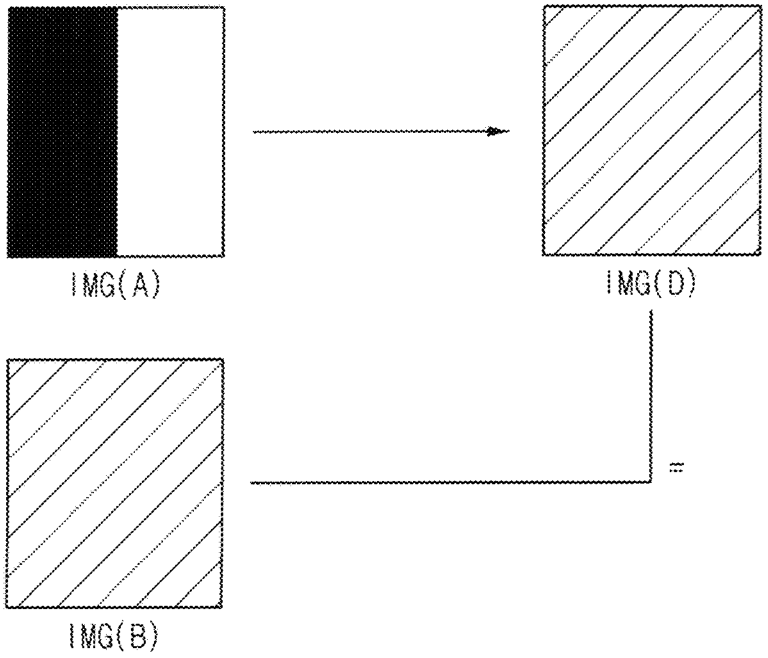

FIG. 3 is a block diagram illustrating an embodiment of a data compensation circuit 10 according to the invention. FIGS. 4A and 4B are diagrams for comparing before and after data compensation of the data compensation circuit 10 of FIG. 3.

Referring to FIG. 3, the data compensation circuit 10 may include a reference frame memory device 100, an accumulated stress memory device 400, a stress data generating block 200, a memory control block 300, and a compensating block 500.

The reference frame memory device 100 may store reference frame data RFD. The reference frame data RFD may serve as a reference for generating stress data SD and generating afterimage compensation data CD (refer to Equation 7 below and FIG. 7). In an embodiment, the reference frame data RFD may be start frame data of input image data IND, for example. The reference frame data RFD stored in the reference frame memory device 100 may be transmitted to the stress data generating block 200 through the memory control block 300. The reference frame data RFD stored in the reference frame memory device 100 may be transmitted to the compensating block 500 through the memory control block 300. The reference frame memory device 100 may receive new reference frame data UD-RFD updated by the compensating block 500 from the compensating block 500, and store the new reference frame data UD-RFD instead of existing reference frame data RFD.

The accumulated stress memory device 400 may store cumulative stress data ASD for each pixel. When the memory control block (also referred to as a memory controller) 300 transmits the stress data SD to the accumulated stress memory device 400, the accumulated stress memory device 400 may store updated cumulative stress data ASD. The cumulative stress data ASD stored in the accumulated stress memory device 400 may be transmitted to the compensating block 500 through the memory control block 300.

The stress data generating block 200 may generate stress data SD for each pixel by comparing output image data OUTD with the reference frame data RFD. Each of the output image data OUTD and the reference frame data RFD may have a gray scale of 0 to 255. The stress data generating block 200 may generate the stress data SD by calculating a luminance stress for each pixel based on a first parameter DDO (refer to Equation 5 below) representing a difference between a first gray scale value according to the output image data OUTD and a reference gray scale value according to the reference frame data RFD. In an embodiment, the stress data generating block 200 may store a predetermined equation for calculating the stress data SD. The stress data generating block 200 may calculate the stress data SD based on the above equation.

The stress data generating block 200 may calculate a luminance correction constant by reflecting luminance data DBV of the input image data IND, and generate luminance correction stress data based on the luminance correction constant.

Referring to FIG. 4A, when a plurality of pixels included in the display panel are driven to have different gray scales (e.g., black and white) in previous display frames as shown in IMG(A), the stress data generating block 200 may calculate stress data SD for each pixel. The above stress data SD may be added and accumulated to the accumulated stress memory device 400. Accordingly, even when being driven to have the same gray scale (e.g., gray) in the next display frames as shown in IMG(B), the pixels may emit light having mutually different luminance for a predetermined period of time. In other words, when the data correction is not performed, a momentary afterimage may occur as shown in IMG(C), and the difference in luminance for the pixels may be visually recognized by the user.

The memory control block 300 may update the cumulative stress data ASD for each pixel by adding the stress data SD for each pixel to the accumulated stress memory device 400. The memory control block 300 may accumulate the stress data SD for each pixel into the accumulated stress memory device 400 at a cumulative rate corresponding to an operation speed of the accumulated stress memory device 400. The memory control block 300 may receive new reference frame data UD-RFD from the compensating block 500. The memory control block 300 may update the existing reference frame data RFD by the new reference frame data UD-RFD updated from the compensating block 500, and transmit the new reference frame data UD-RFD to the stress data generating block 200. The stress data generating block 200 may generate the stress data SD based on the new reference frame data UD-RFD.

The compensating block 500 may generate the output image data OUTD by generating afterimage compensation data CD for each pixel based on the cumulative stress data ASD and compensating input image data IND based on the afterimage compensation data CD. Specifically, the compensating block 500 may read the cumulative stress data ASD for each pixel from the accumulated stress memory device 400, and generate the afterimage compensation data CD based on the difference between a second gray scale value according to the cumulative stress data ASD and the input image data IND for each pixel and the reference gray scale value. In an embodiment, the compensating block 500 may generate the afterimage compensation data CD for each pixel to perform the afterimage compensation by applying the cumulative stress data ASD for each pixel to the equation or the look up table to output an amount of luminance drop for each pixel, and by calculating a luminance compensation amount for each pixel corresponding to the amount of luminance drop for each pixel, for example. The compensating block 500 may store a predetermined equation for calculating the afterimage compensation data CD. Specifically, the compensating block 500 may store the equation for generating the afterimage compensation data CD based on a second parameter DDI (refer to Equation 7 below and FIG. 7) representing the difference between the second gray scale value and the reference gray scale value.

Referring to FIGS. 4A and 4B, when a plurality of pixels included in the display panel are driven to have different gray scales (e.g., black and white) in previous display frames as shown in IMG(A), the stress data SD may be accumulated in the accumulated stress memory device 400. Accordingly, even when being driven to have the same gray scale (e.g., gray) in the next display frames as shown in IMG(B), the pixels may emit light having mutually different luminance for a predetermined period of time. When the data correction is performed in the compensating block 500, each pixel may display an output image having the same luminance as a target image. Specifically, the compensating block 500 generates the afterimage compensation data CD for each pixel based on the cumulative stress data ASD and compensates input image data IND based on the afterimage compensation data CD, so that an output image having the same luminance as the target image IMG(B) may be displayed as shown in IMG(D). The data compensation circuit 10 may improve the hysteresis of the first transistor T1 through the above data compensation, and accordingly, the momentary afterimage of the display device due to the hysteresis of the first transistor T1 may be improved.

When a size of the luminance compensation amount of the afterimage compensation data CD becomes 0, the compensating block 500 may update the reference frame data RFD so that the new reference frame data UD-RFD may be transmitted to the memory controller 300. Hereinafter, a detailed operation of the data compensation circuit 10 will be described with reference to FIGS. 5 to 7.

Figure 5:
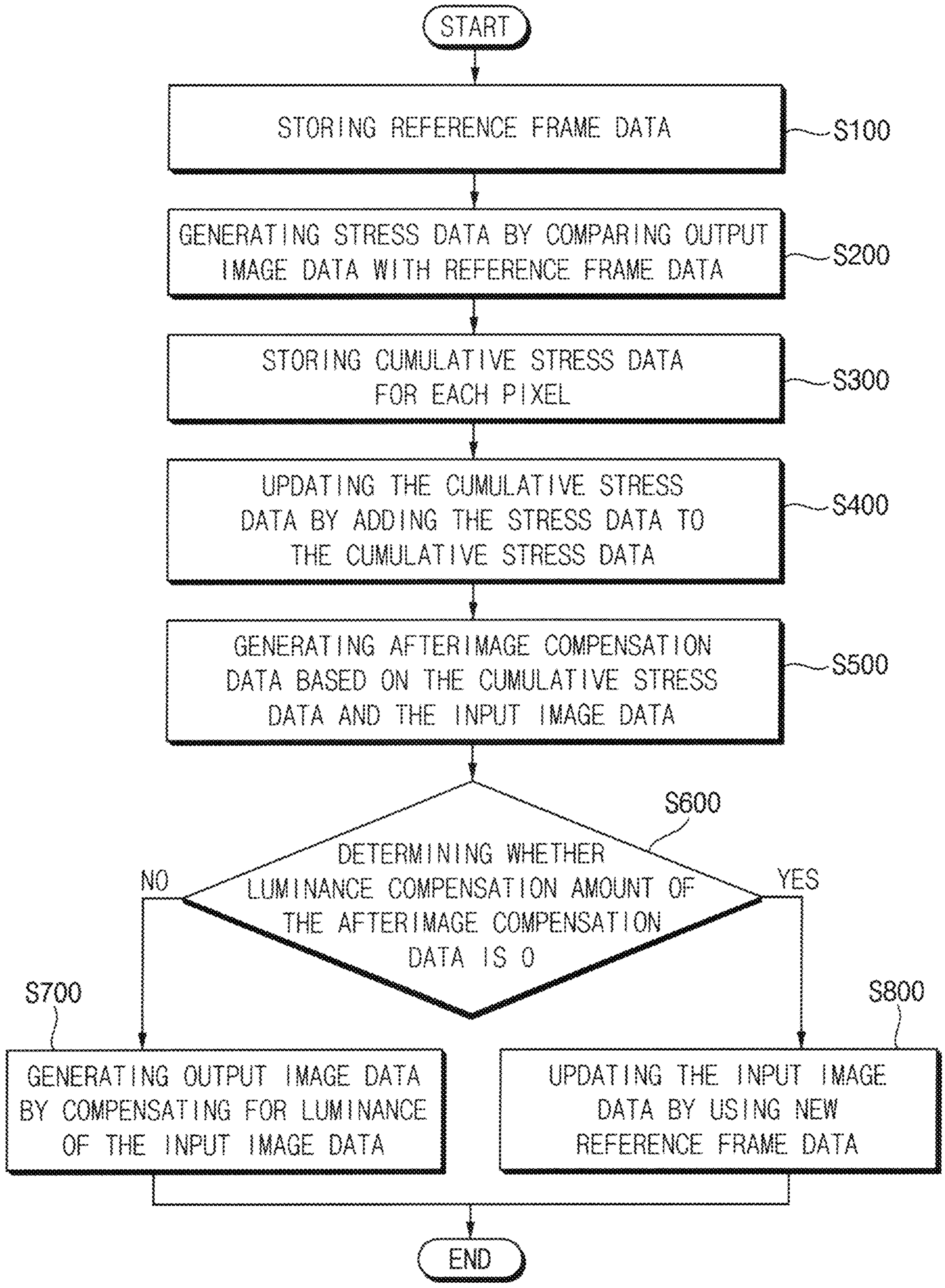
FIG. 5 is a flowchart illustrating an operation of the data compensation circuit of FIG. 3.
Figure 6:
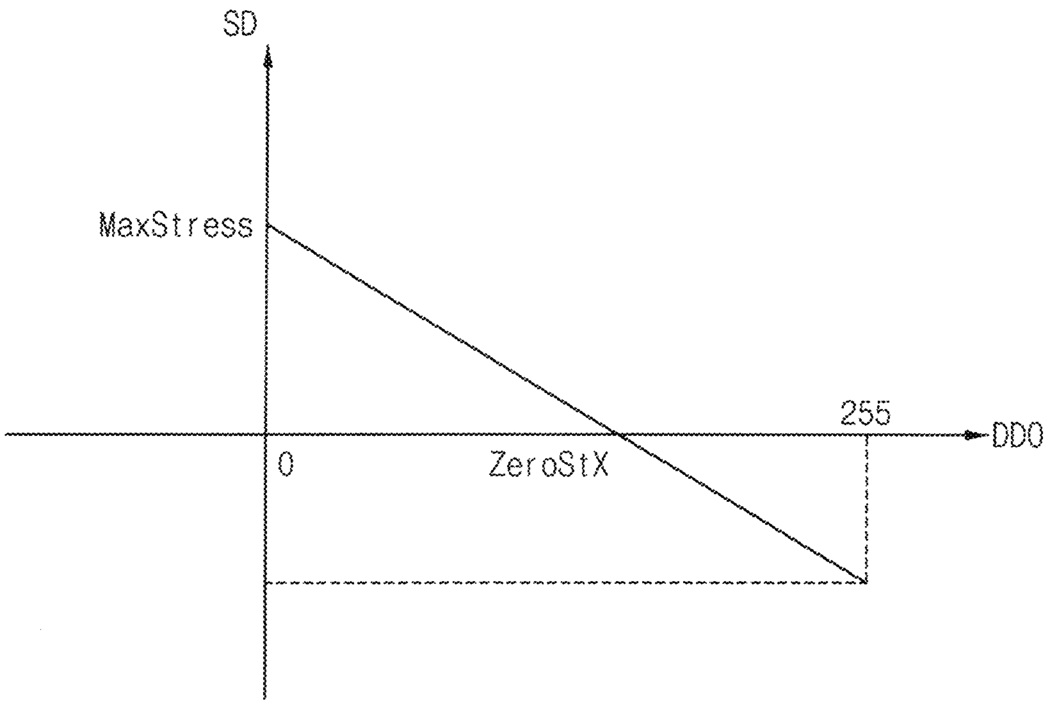
FIG. 6 is a graph illustrating an embodiment of stress data according to the invention.
Figure 7:
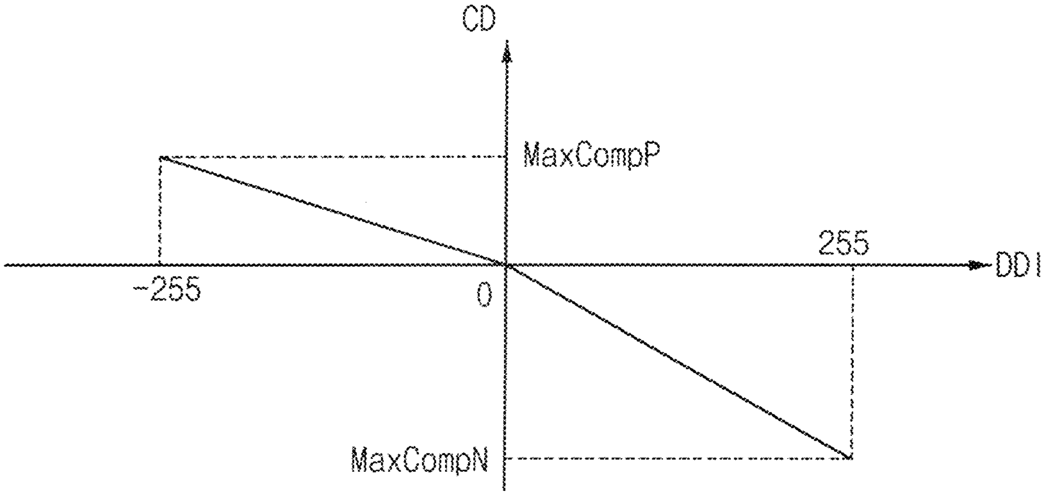
FIG. 7 is a graph illustrating an embodiment of afterimage compensation data according to the invention.

FIG. 5 is a flowchart illustrating an embodiment of an operation of the data compensation circuit 10 of FIG. 3. FIG. 6 is a graph illustrating an embodiment of the stress data SD according to the invention. FIG. 7 is a graph illustrating an embodiment of the afterimage compensation data CD according to the invention.

Referring to FIGS. 5 to 7, in an embodiment, the reference frame memory device 100 may store the reference frame data RFD (S100). The stress data generating block 200 may generate the stress data SD by comparing the output image data OUTD with the reference frame data RFD (S200). The accumulated stress memory device 400 may store the cumulative stress data ASD for each pixel (S300). The memory control block 300 may update the cumulative stress data ASD by adding the stress data SD to the cumulative stress data ASD (S400). The compensating block 500 may generate the afterimage compensation data CD based on the cumulative stress data ASD and the input image data IND (S500). The compensating block 500 may determine whether luminance compensation amount of the afterimage compensation data is 0 (S600). When the luminance compensation amount of the afterimage compensation data CD is not 0, the compensating block 500 may generate the output image data OUTD by compensating for the luminance of the input image data IND (S700). When the luminance compensation amount of the afterimage compensation data CD is 0, the compensating block 500 may update the input image data IND by the new reference frame data UD-RFD (S800).

The reference frame memory device 100 may store the reference frame data RFD (S100). The reference frame data RFD may serve as a reference for generating stress data SD and generating afterimage compensation data CD. In an embodiment, the reference frame data RFD may be start frame data of input image data IND, for example. The reference frame data RFD stored in the reference frame memory device 100 may be transmitted to the stress data generating block 200. Specifically, when the stress data generating block 200 generates the stress data SD, the stress data generating block 200 may receive the reference frame data RFD stored in the reference frame memory device 100, and compare the output image data OUTD with the reference frame data RFD. The memory control block 300 may transmit the reference frame data RFD to the compensating block 500. Specifically, when the compensating block 500 generates the afterimage compensation data CD, the compensating block 500 may receive the reference frame data RFD stored in the reference frame memory device 100 from the memory control block 300, and compare the input image data IND with the reference frame data RFD. The memory control block 300 may receive the new reference frame data UD-RFD updated by the compensating block 500 from the compensating block 500, and update the existing reference frame data RFD by the new reference frame data UD-RFD.

The stress data generating block 200 may generate the stress data SD by comparing the output image data OUTD with the reference frame data RFD (S200). The stress data generating block 200 may generate the stress data SD for each pixel at a frame rate (or display rate) (e.g., about 60 hertz (Hz) to about 120 Hz) by comparing output image data OUTD with the reference frame data RFD. Each of the output image data OUTD and the reference frame data RFD may have a gray scale of 0 to 255. Specifically, the stress data generating block 200 may generate the stress data SD by calculating a luminance stress for each pixel based on a first parameter DDO representing a difference between a first gray scale value according to the output image data OUTD and a reference gray scale value according to the reference frame data RFD. In an embodiment, the stress data SD for each pixel may be a value corresponding to the luminance for each pixel of the output image data OUTD, and the cumulative stress data ASD for each pixel may be a value generated by accumulating the value corresponding to the luminance for each pixel of the output image data OUTD, for example. In another embodiment, the stress data SD for each pixel may be a value corresponding to the gray scale for each pixel of the output image data OUTD, and the cumulative stress data ASD for each pixel may be a value generated by accumulating the value corresponding to the gray scale for each pixel of the output image data OUTD, for example. In an embodiment, the stress data SD for each pixel and the cumulative stress data ASD for each pixel may be generated in consideration of various conditions such as time, temperature, luminance, and current, for example.

Referring to FIG. 6, in an embodiment, the stress data generating block 200 may store a predetermined equation for calculating the stress data SD. Specifically, the stress data generating block 200 may store the equation for generating the stress data SD based on the first parameter DDO representing the difference between the reference grayscale value and the first gray scale value according to the output image data OUTD. In an embodiment, the stress data generating block 200 may calculate the stress data SD according to Equation 5 below, for example.

$$SD = A1*[(-MaxStress/ZeroStX)*A0*DDO+MaxStress] \quad \text{[Equation 5]}$$

In Equation 5, DDO represents a first parameter DDO, A0 and A1 represent stress correction factors, MaxStress represents the maximum value of the stress data SD, and ZeroStX represents a value of the first parameter DDO when the value of the stress data SD is 0. When the output image data OUTD and the reference frame data RFD have the same value (e.g., first gray scale value=reference gray scale value), the value of the first parameter DDO becomes 0, so the stress data SD may have the maximum value. In other words, the same gray scale value between the output image data OUTD and the reference frame data RFD may signify that an electrical stress is applied to the first transistor T1. On the contrary, an increase in the difference between the gray scale value of the output image data OUTD and the gray scale value of the reference frame data RFD may signify that the electrical stress applied to the first transistor T1 is decreased.

In an embodiment, the stress data generating block 200 may calculate a luminance correction constant by reflecting luminance data DBV of the input image data IND, and generate luminance correction stress data based on the luminance correction constant. Specifically, the luminance correction stress data may be a value obtained by multiplying the stress data SD by the luminance correction constant. The luminance correction constant may be a parameter that represents a difference in luminance of the output image data OUTD based on the luminance of the reference frame data RFD. In other words, when the calculation of stress data SD is outputted, the luminance correction constant may be a parameter for reflecting a difference in luminance between the reference frame data RFD and the output image data OUTD. In an embodiment, the stress data SD may be different in the case that the luminance of the reference frame data RFD is about 400 nits and the luminance of the reference frame data RFD is about 700 nits, for example. Accordingly, when the calculation of stress data SD is outputted, the luminance correction stress data may reflect the difference in luminance values between the output image data OUTD and the reference frame data RFD in addition to the difference in gray scale values between the output image data OUTD and the reference frame data RFD. The stress data generating block 200 may transmit the luminance correction stress data to the accumulated stress memory device 400. The accumulated stress memory device 400 may add and store the luminance correction stress data to the cumulative stress data ASD. The compensating block 500 may receive the cumulative stress data ASD in which the luminance correction stress data stored in the accumulated stress memory device 400 is accumulated from the memory control block 300, and based thereon, may generate the afterimage compensation data CD in which the difference in luminance between the reference frame data RFD and the output image data OUTD is reflected.

When the difference between the gray scale value of the output image data OUTD and the gray scale value of the reference frame data RFD increases beyond a predetermined value (e.g., when the value of the first parameter DDO becomes greater than ZeroStX in Equation 5), the stress data SD may have a negative value. In this case, since the electrical stress applied to the first transistor T1 is released, the cumulative stress for each pixel may be reduced.

The accumulated stress memory device 400 may store the cumulative stress data ASD for each pixel (S300). Specifically, when the stress data SD generated by the stress data generating block 200 is added as time passes, the cumulative stress data ASD may be updated in the memory control block 300. When the memory controller 300 transmits the cumulative stress data ASD to the accumulated stress memory device 400, the accumulated stress memory device 400 may store updated cumulative stress data ASD. The cumulative stress data ASD stored in the accumulated stress memory device 400 may be transmitted to the compensating block 500. Specifically, when the compensating block 500 generates the afterimage compensation data CD, the compensating block 500 may receive the cumulative stress data ASD stored in the accumulated stress memory device 400 from the memory control block 300, and generate the afterimage compensation data CD proportional to the cumulative stress data ASD according to the equation or the look up table.

In an embodiment, the cumulative stress data ASD may be increased in proportion to a time duration during which the difference between the first gray scale value and the reference gray scale value is maintained. Specifically, as the time duration during which the difference between the gray scale value of the output image data OUTD and the gray scale value of the reference frame data RFD is increased, the electrical stress applied to the first transistor T1 may be increased. Accordingly, when the time duration for maintaining the difference between the first gray scale value and the reference gray scale value becomes longer, the luminance compensation amount of the afterimage compensation data CD generated by the compensating block 500 may be increased. In an embodiment, the cumulative stress data ASD may be calculated as a sum of products between the stress data SD and the unit time duration (e.g., about 1/120 second (sec) to about 1/60 sec), for example. The cumulative stress data ASD may be expressed as Equation 6 below.

$$ASD = \Sigma(SD*\Delta t - SD\_Release) \quad \text{[Equation 6]}$$

In Equation 6, Δt represents the unit time duration, and SD_Release represents a release value of the stress data SD over time. In other words, the cumulative stress data ASD may be increased in proportion to the stress data SD and the time and decreased by the release of the stress data SD.

The memory control block 300 may update the cumulative stress data ASD for each pixel by adding the stress data SD for each pixel to the accumulated stress memory device 400 (S400). Specifically, the memory control block 300 may receive the stress data SD for each pixel from the stress data generating block 200 at the frame rate (or display rate). The memory control block 300 may accumulate the stress data SD for each pixel into the accumulated stress memory device 400 at a cumulative rate (e.g., less than about 1 Hz) corresponding to the operating speed of the accumulated stress memory device 400.

The memory control block 300 may receive new reference frame data UD-RFD from the compensating block 500. The memory control block 300 may update the existing reference frame data RFD by the new reference frame data UD-RFD updated from the compensating block 500, and transmit the new reference frame data UD-RFD to the stress data generating block 200. The stress data generating block 200 may generate the stress data SD based on the new reference frame data UD-RFD.

The compensating block 500 may generate the afterimage compensation data CD based on the cumulative stress data ASD and the input image data IND (S500). The compensating block 500 may determine whether luminance compensation amount of the afterimage compensation data is 0 (S600). When the luminance compensation amount of the afterimage compensation data CD is not 0, the compensating block 500 may generate the output image data OUTD by compensating for the luminance of the input image data IND (S700). Specifically, the compensating block 500 may read the cumulative stress data ASD for each pixel from the accumulated stress memory device 400, and generate the afterimage compensation data CD based on the difference between a second gray scale value according to the cumulative stress data ASD and the input image data IND for each pixel and the reference gray scale value. In an embodiment, the compensating block 500 may generate the afterimage compensation data CD for each pixel to perform the afterimage compensation by applying the cumulative stress data ASD for each pixel to the equation or the look up table to output the amount of luminance drop for each pixel, and by calculating a luminance compensation amount for each pixel corresponding to the amount of luminance drop for each pixel, for example.

In an embodiment, the compensating block 500 may determine the luminance compensation amount of the afterimage compensation data CD for each pixel at the frame rate (or display rate) (e.g., about 60 Hz to about 120 Hz) by comparing the input image data IND with the reference frame data RFD. Each of the input image data IND and reference frame data RFD may have a gray scale of 0 to 255. Specifically, the compensating block 500 may generate the afterimage compensation data CD based on the second parameter DDI representing the difference between the reference gray scale value and the second gray scale value according to the input image data IND, and may generate the output image data OUTD by compensating the input image data IND based on the afterimage compensation data CD.

Referring to FIG. 7, in an embodiment, the compensating block 500 may store a predetermined equation for calculating the afterimage compensation data CD. Specifically, the compensating block 500 may store the equation for generating the afterimage compensation data CD based on a second parameter DDI representing the difference between the second gray scale value and the reference gray scale value. In an embodiment, the compensating block 500 may calculate the afterimage compensation data CD based on Equation 7 below, for example.

$$CD = A2 * ASD * \mathrm{MaxComp} * DDI \quad \text{[Equation 7]}$$

In Equation 7, DDI represents the second parameter DDI, A2 represents an afterimage compensation correction factor, MaxComp represents the maximum value of the afterimage compensation data CD, and ASD represents a value of the cumulative stress data ASD. In an embodiment, referring to FIG. 7, the afterimage compensation data CD may have the positive maximum value MaxCompP when the value of the second parameter DDI is −255 and may have the negative maximum value MaxCompN when the value of the second parameter DDI is 255. With regard to the afterimage compensation correction factor, a luminance increase compensation or a luminance decrease compensation may be determined according to a bias condition of the cumulative stress data ASD. In addition, with regard to the maximum value of the afterimage compensation data CD, the luminance increase compensation or the luminance decrease compensation may be determined according to the bias condition of the cumulative stress data ASD.

In an embodiment, when the second gray scale value is greater than the reference gray scale value, the compensating block 500 may generate the afterimage compensation data CD that performs a compensation of decreasing the luminance of the input image data IND. In another embodiment, when the second gray scale value is smaller than the reference gray scale value, the compensating block 500 may generate the afterimage compensation data CD that perform a compensation of increasing the luminance of the input image data IND. In an embodiment, the case that the second parameter DDI is greater than 0 may be assumed that the cumulative stress data ASD is maintained under a bias condition having a low luminance, for example. The output image data OUTD may be expressed as having a luminance higher than that of the input image data IND. Accordingly, in this case, the afterimage compensation data CD may perform the data compensation of decreasing the luminance of the input image data IND. In another embodiment, the case that the second parameter DDI is smaller than 0 may be assumed that the cumulative stress data ASD is maintained under a bias condition having a high luminance, for example. The output image data OUTD may be expressed as having a luminance lower than that of the input image data IND. Accordingly, in this case, the afterimage compensation data CD may perform the data compensation of increasing the luminance of the input image data IND.

When a size of the luminance compensation amount of the afterimage compensation data CD becomes 0, the compensating block 500 may update the input image data IND by the new reference frame data UD-RFD (S800), so that the new reference frame data UD-RFD may be transmitted to the memory controller 300. Specifically, when the input image data IND and the reference frame data RFD have the same value (e.g., second gray scale value=reference gray scale value), the value of the second parameter DDI becomes 0, so the afterimage compensation data CD may have a minimum value (e.g., 0). The compensating block 500 may update the input image data IND, when the afterimage compensation data CD becomes the minimum value, as the new reference frame data UD-RFD. The memory control block 300 may receive the new reference frame data UD-RFD from the compensating block 500, and update the new reference frame data UD-RFD as the reference frame data RFD. The data compensation circuit 10 may repeat the next data compensation operation by the new reference frame data UD-RFD. The data compensation circuit 10 may improve the hysteresis of the first transistor T1 through the above data compensation. Accordingly, the momentary afterimage of the display device due to the hysteresis of the first transistor T1 may be improved.

Figure 8:
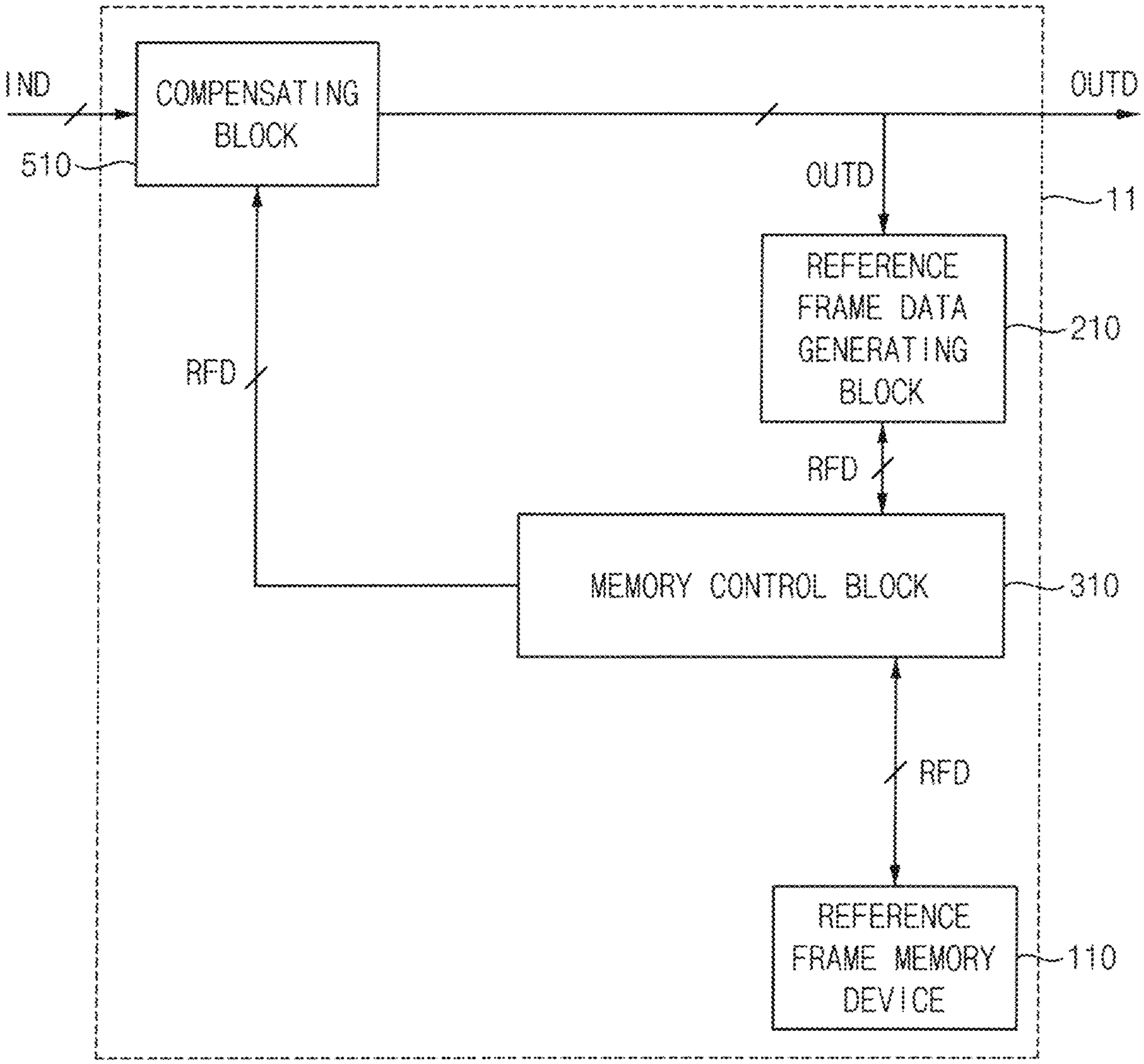
FIG. 8 is a block diagram illustrating an embodiment of a data compensation circuit according to the invention.
Figure 9A:
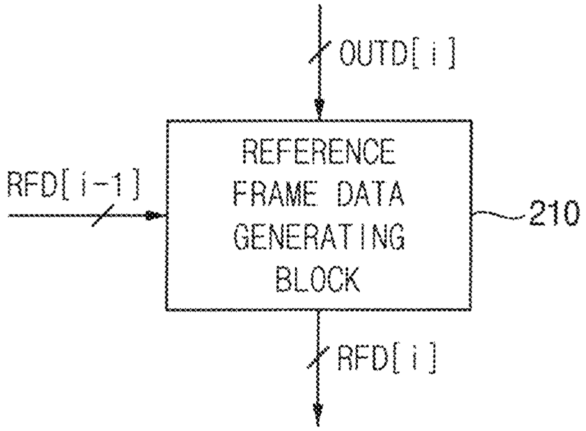
FIG. 9A is a diagram for describing that the data compensation circuit of FIG. 8 compensates input image data to generate output image data.
Figure 9B:
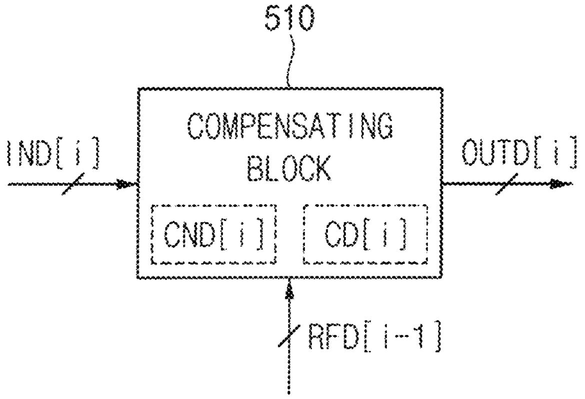
FIG. 9B is a diagram for describing that the data compensation circuit of FIG. 8 generates (i.e., updates) reference frame data.

FIG. 8 is a block diagram illustrating an embodiment of a data compensation circuit according to the invention, FIG. 9A is a diagram for describing that the data compensation circuit of FIG. 8 compensates input image data to generate output image data, and FIG. 9B is a diagram for describing that the data compensation circuit of FIG. 8 generates (i.e., updates) reference frame data.

Referring to FIGS. 8 to 9B, the data compensation circuit 11 may include a reference frame memory device 110, a reference frame data generating block 210, a memory control block 310, and a compensating block 510. Unlike the data compensation circuit 10 of FIG. 3, the data compensation circuit 11 may not generate the stress data SD for each pixel. Thus, the data compensation circuit 11 may not include components corresponding to the stress data generating block 200 and the accumulated stress memory device 400. Instead, because the data compensation circuit 11 needs to generate (i.e., update) reference frame data RFD by accumulating the reference frame data RFD in each display frame, the data compensation circuit 11 may include the reference frame data generating block 210 that performs the operation.

The reference frame memory device 110 may store the reference frame data RFD. The reference frame data RFD may serve as a reference for generating afterimage compensation data CD and generating output image data OUTD. By the reference frame data generating block 210, the reference frame data RFD may be generated (i.e., updated) by accumulating the reference frame data RFD in each display frame. Specifically, when an (i)th reference frame data RFD[i] is generated in an (i)th display frame, where i is an integer greater than or equal to 2, the reference frame memory device 110 may store the (i)th reference frame data RFD[i] instead of an (i−1)th reference frame data RFD[i−1] existing (or stored) in the reference frame memory device 110, and may provide the (i)th reference frame data RFD[i] in an (i+1)th display frame. For example, when the second reference frame data RFD[2] is generated based on the second output image frame OUTD[2] and the first reference frame data RFD[1] in the second display frame, where the second reference frame data RFD[2] is used to generate the third output image data OUTD[3] in the third display frame, the reference frame memory device 110 may store the second reference frame data RFD[2] instead of the first reference frame data RFD[1] stored in the reference frame memory device 110, and may provide the second reference frame data RFD[2] to the compensating block 510 via the memory control block 310 in the third display frame. In addition, when the third reference frame data RFD[3] is generated based on the third output image frame OUTD[3] and the second reference frame data RFD[2] in the third display frame, where the third reference frame data RFD[3] is used to generate the fourth output image data OUTD[4] in the fourth display frame, the reference frame memory device 110 may store the third reference frame data RFD[3] instead of the second reference frame data RFD[2] stored in the reference frame memory device 110, and may provide the third reference frame data RFD[3] to the compensating block 510 via the memory control block 310 in the fourth display frame. In an embodiment, an initial reference frame data RFD may be set as 0.

The reference frame data generating block 210 may generate the (i)th reference frame data RFD[i] based on the (i−1)th reference frame data RFD[i−1] that is generated in the (i−1)th display frame and the (i)th output image data OUTD[i] that is generated based on the (i−1)th reference frame data RFD[i−1] in the (i)th display frame. That is, the reference frame data generating block 210 may generate a next reference frame data RFD that is used in a next display frame based on a current reference frame data RFD that is used in a current display frame and a current output image data OUTD that is generated in the current display frame, where the current reference frame data RFD is generated in a previous display frame. For example, the second reference frame data RFD[2] may be generated (and stored in the reference frame memory device 110) based on the second output image data OUTD[2] and the first reference frame data RFD[1] in the second display frame. Here, the second reference frame data RFD[2] may be used to generate the afterimage compensation data CD[3] (and thus generate the third output image data OUTD[3]) in the third display frame. In addition, the third reference frame data RFD[3] may be generated (and stored in the reference frame memory device 110) based on the third output image data OUTD[3] and the second reference frame data RFD[2] in the third display frame. Here, the third reference frame data RFD[3] may be used to generate the afterimage compensation data CD[4] (and thus generate the fourth output image data OUTD[4]) in the fourth display frame. As described above, the initial reference frame data RFD may be set as 0.

As illustrated in FIG. 9A, the reference frame data generating block 210 may generate the (i)th reference frame data RFD[i] based on the (i−1)th reference frame data RFD[i−1] that is generated in the (i−1)th display frame (i.e., that is used in the (i)th display frame) and the (i)th output image data OUTD[i] that is generated based on the (i−1)th reference frame data RFD[i−1] in the (i)th display frame. In addition, the (i)th reference frame data RFD[i] that is generated in the (i)th display frame may be stored in the reference frame memory device 110. In an embodiment, in the (i)th display frame, the reference frame data generating block 210 may generate the (i)th reference frame data RFD[i] according to Equation 8 below, for example.

$$\mathrm{RFD}[i]=M2*\mathrm{RFD}[i-1]+M3*\mathrm{OUTD}[i], \quad \text{[Equation 8]}$$

In Equation 8, RFD[i] represents the (i)th reference frame data that is generated in the (i)th display frame, RFD[i−1] represents the (i−1)th reference frame data that is generated in the (i−1)th display frame, OUTD[i] represents the (i)th output image data that is generated in the (i)th display frame, M2 represents a cumulative correction factor, and M3 represents a luminance correction factor. The cumulative correction factor M2 may be a value that determines how much the (i−1)th reference frame data RFD[i−1] is reflected in calculating the (i)th reference frame data RFD[i]. For example, the cumulative correction factor M2 may be a value smaller than or equal to 1. In addition, the luminance correction factor M3 may be a value that is multiplied by the (i)th output image data OUTD[i]. For example, the luminance correction factor M3 may be determined in consideration of various factors affecting luminance, such as an emission duty, an emission off ratio (e.g., AMOLED Impulse Driving (AID) off ratio of AID dimming technique), and the like.

The memory control block 310 may control the reference frame memory device 110. For example, in the (i)th display frame, when the reference frame data generating block 210 generates the (i)th reference frame data RFD[i], the memory control block 310 may transmit the (i)th reference frame data RFD[i] to the reference frame memory device 110, and the reference frame memory device 110 may store the (i)th reference frame data RFD[i] instead of the (i−1)th reference frame memory data RFD[i−1] stored in the reference frame memory device 110. In addition, when the (i+1)th display frame starts, the memory control block 310 may provide the (i)th reference frame data RFD[i] that is used in the (i+1)th display frame to the compensating block 510 and the reference frame data generating block 210.

The compensating block 510 may generate the (i)th output image data OUTD[i] by generating the (i)th conversion image data CND[i] based on the (i)th input image data IND[i] that is input in the (i)th display frame, by generating the afterimage compensation data CD[i] for each pixel based on the (i)th conversion image data CND[i] and the (i−1)th reference frame data RFD[i−1], and by compensating the (i)th input image data IND[i] based on the afterimage compensation data CD[i]. For example, the compensating block 510 may generate the afterimage compensation data CD[i] for each pixel to perform an afterimage compensation by deriving an amount of luminance drop for each pixel based on the (i)th conversion image data CND[i] and the (i−1)th reference frame data RFD[i−1] and by calculating a luminance compensation amount for each pixel corresponding to the amount of luminance drop for each pixel. Here, when the luminance compensation amount of the afterimage compensation data CD[i] is not 0, the compensating block 510 may compensate the luminance of the (i)th input image data IND[i] to generate the (i)th output image data OUTD[i]. Specifically, in the (i)th display frame, the compensating block 510 may receive the (i−1)th reference frame data RFD[i−1] from the reference frame memory device 110, may generate the (i)th conversion image data CND[i] based on the (i)th input image data IND[i], and may generate the afterimage compensation data CD[i] for each pixel based on a difference between the reference gray scale value according to the (i−1)th reference frame data RFD[i−1] and the gray scale value according to the (i)th conversion image data CND[i]. In an embodiment, the compensating block 510 may generate the afterimage compensation data CD for each pixel to perform the afterimage compensation by including an equation or a look up table for calculating the afterimage compensation data CD for each pixel, by deriving the amount of luminance drop for each pixel using the equation or the look up table, by calculating the luminance compensation amount for each pixel corresponding to the amount of luminance drop for each pixel, for example.

In an embodiment, the compensating block 510 may generate the (i)th conversion image data according to Equation 9 below, for example.

$$CND[i]=M1*\mathrm{IND}[i] \qquad \text{[Equation 9]}$$

In Equation 9, CND[i] represents the (i)th conversion image data, IND[i] represents the (i)th input image data, and M1 represents a data correction factor. For example, the data correction factor M1 may be a value that is multiplied by the (i)th input image data IND[i]. For example, the data correction factor M1 may be proportional to the luminance correction factor M3 that is determined in consideration of various factors affecting luminance, such as an emission duty, an emission off ratio, and the like, where the luminance correction factor M3 is a value that is multiplied by the (i)th output image data OUTD[i] to generate the (i)th reference frame data RFD[i].

In embodiments, in the (i)th display frame, the compensating block 510 may generate the afterimage compensation data CD[i] which performs a compensation of decreasing a luminance of the (i)th input image data IND[i] when the gray scale value according to the (i)th conversion image data CND[i] is greater than the reference gray scale value according to the (i−1)th reference frame data RFD[i−1], may generate the afterimage compensation data CD[i] which performs a compensation of increasing the luminance of the (i)th input image data IND[i] when the gray scale value according to the (i)th conversion image data CND[i] is smaller than the reference gray scale value according to the (i−1)th reference frame data RFD[i−1], and may generate the afterimage compensation data CD[i] which does not perform a compensation of adjusting the luminance of the (i)th input image data IND[i] when the gray scale value according to the (i)th conversion image data CND[i] is equal to the reference gray scale value according to the (i−1)th reference frame data RFD[i−1]. For example, when the gray scale value according to the (i)th conversion image data CND[i] is greater than the reference gray scale value according to the (i−1)th reference frame data RFD[i−1], the (i)th output image data OUTD[i] may be expressed as having a luminance higher than that of the (i)th input image data IND[i]. Accordingly, in this case, the afterimage compensation data CD[i] may perform the data compensation of decreasing the luminance of the (i)th input image data IND[i]. In addition, when the gray scale value according to the (i)th conversion image data CND[i] is smaller than the reference gray scale value according to the (i−1)th reference frame data RFD[i−1], the (i)th output image data OUTD[i] may be expressed as having a luminance lower than that of the (i)th input image data IND[i]. Accordingly, in this case, the afterimage compensation data CD[i] may perform the data compensation of increasing the luminance of the (i)th input image data IND[i]. Further, when the gray scale value according to the (i)th conversion image data CND[i] is equal to the reference gray scale value according to the (i−1)th reference frame data RFD[i−1], the (i)th output image data OUTD[i] may be expressed as having a luminance equal to that of the (i)th input image data IND[i]. Accordingly, in this case, the afterimage compensation data CD[i] may not perform the data compensation of adjusting (i.e., increasing or decreasing) the luminance of the (i)th input image data IND[i].

In an embodiment, the compensating block 510 may generate the afterimage compensation data CD[i] for each pixel according to Equations 10 to 12 below, for example.

$$\mathrm{CD}[i]=B*\mathrm{MaxComp}N*DDI[i],\ DDI[i]>0 \qquad \text{[Equation 10]}$$

$$\mathrm{CD}[i]=C*\mathrm{MaxComp}P*DDI[i],\ DDI[i]<0 \qquad \text{[Equation 11]}$$

$$\mathrm{CD}[i]=0,\ DDI[i]=0 \qquad \text{[Equation 12]}$$

In Equations 10 to 12, CD[i] represents the afterimage compensation data for each pixel, DDI[i] represents the difference between the reference gray scale value according to the (i−1)th reference frame data RFD[i−1] and the gray scale value according to the (i)th conversion image data CND[i], MaxcompN represents a maximum value of the afterimage compensation data CD[i] when DDI[i]>0 (i.e., MaxcompN shown in FIG. 7), MaxcompP represents a maximum value of the afterimage compensation data CD[i] when DDI[i]<0 (i.e., MaxcompP shown in FIG. 7), B represents an afterimage compensation correction factor when DDI[i]>0, and C represents an afterimage compensation correction factor when DDI[i]<0. Here, each of the afterimage compensation correction factors B and C may be determined to be a value for performing the luminance increasing compensation or the luminance decreasing compensation. In addition, each of the maximum values MaxcompN and MaxcompP of the afterimage compensation data CD[i] may be determined to be a value for performing the luminance increasing compensation or the luminance decreasing compensation. The compensating block 510 may generate the (i)th output image data OUTD[i] by compensating the (i)th input image data IND[i] based on the afterimage compensation data CD[i].

As described above, the data compensation circuit 11 may improve the hysteresis of the first transistor T1 through the above data compensation. Accordingly, the momentary afterimage of the display device due to the hysteresis of the first transistor T1 may be improved. In addition, because the data compensation circuit 11 does not generate stress data for each pixel unlike the data compensation circuit 10 of FIG. 3, the data compensation circuit 11 may not include components for generating the stress data for each pixel, so that a structure of the data compensation circuit 11 may be simplified as compared to that of the data compensation circuit 10 of FIG. 3. Further, an operation of the data compensation circuit 11 may be relatively fast as compared to that of the data compensation circuit 10 of FIG. 3 because the data compensation circuit 11 does not have a load for operating the components for generating the stress data for each pixel.

Figure 10:
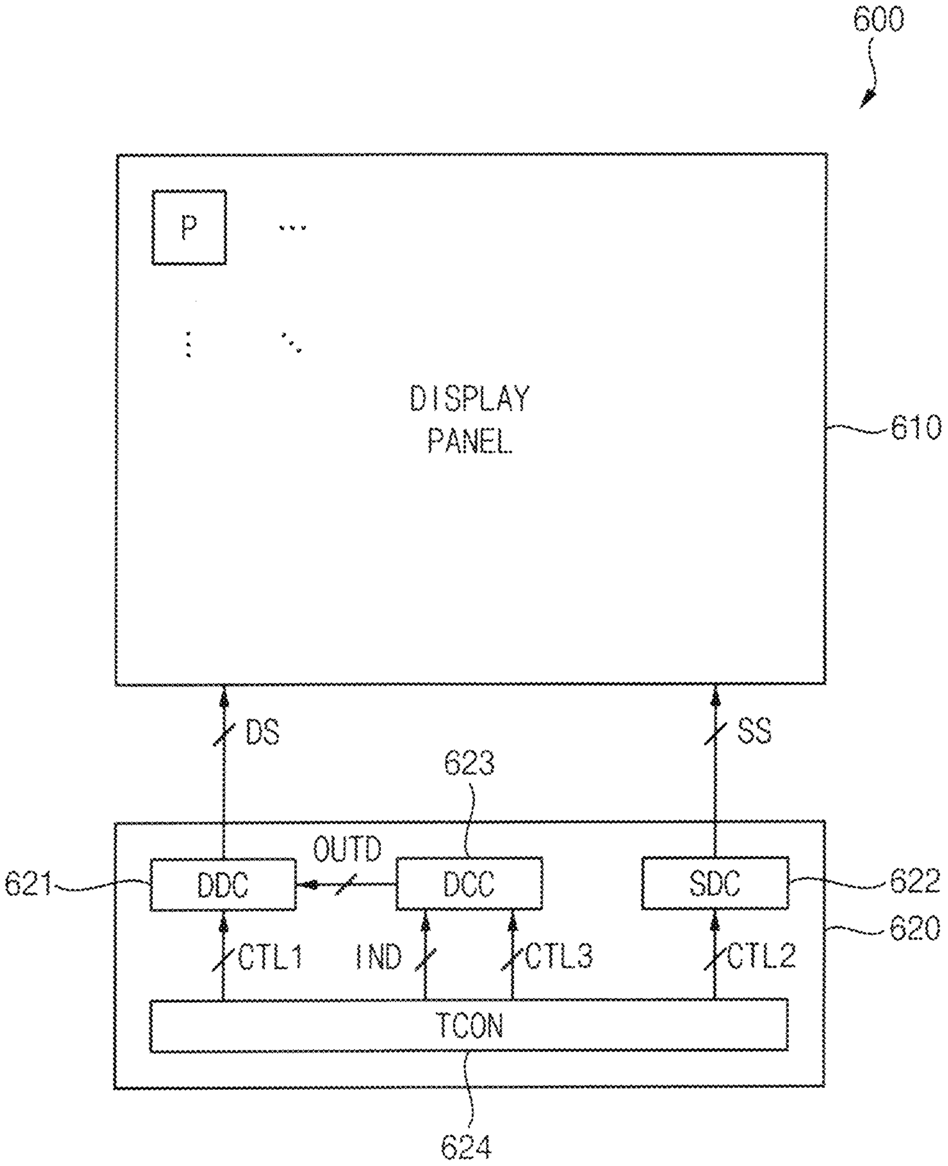
FIG. 10 is a block diagram illustrating an embodiment of a display device in the embodiments of the invention.

FIG. 10 is a block diagram illustrating an embodiment of a display device according to the invention.

Referring to FIG. 10, the display device 600 may include a display panel 610 and a display panel driving circuit 620. The display device 600 may be an organic light emitting display device, however, the display device 600 is not limited thereto.

The display panel 610 may include pixels P. The pixels P may include red display pixels, green display pixels, and blue display pixels. The display panel driving circuit 620 may drive the display panel 610. The display panel driving circuit 620 may include a data driving circuit 621, a scan driving circuit 622, a data compensation circuit 623, and a timing control circuit 624. The display panel 610 may be connected to the data driving circuit 621 through data lines, and may be connected to the scan driving circuit 622 through scan lines. The data driving circuit 621 may provide a data signal DS to the display panel 610 through the data lines. In other words, the data driving circuit 621 may provide the data signal DS to the pixels P. The scan driving circuit 622 may provide a scan signal SS to the display panel 610 through the scan lines. In other words, the scan driving circuit 622 may provide the scan signal SS to the pixels P. The data compensation circuit 623 may generate output image data OUTD corresponding to the data signal DS by compensating input image data IND. The data compensation circuit 623 may perform a momentary afterimage compensation with respect to the input image data IND. In an embodiment, as shown in FIG. 10, the data compensation circuit 623 may be independently implemented outside the timing control circuit 624, and receive the input image data IND generated by the external component (such as a graphic processing unit ("GPU")) through the timing control circuit 624. In another embodiment, the data compensation circuit 623 may be implemented inside the timing control circuit 624, and directly receive the input image data IND generated from the external component. The timing control circuit 624 may control the data driving circuit 621, the scan driving circuit 622, and the data compensation circuit 623 by generating a plurality of control signals CTL1, CTL2 and CTL3 and providing the control signals to the data driving circuit 621, the scan driving circuit 622 and the data compensation circuit 623.

In an embodiment, the data compensation circuit 623 may include a reference frame memory device for storing reference frame data, an accumulated stress memory device for storing cumulative stress data for each pixel P, a stress data generating block for comparing output image data OUTD with the reference frame data to generate stress data for each pixel P, a memory control block for adding the stress data to the cumulative stress data to update the cumulative stress data, and a compensating block for generating the output image data OUTD by generating afterimage compensation data for each pixel P based on the cumulative stress data and compensating input image data IND based on the afterimage compensation data. The data compensation circuit 623 may improve hysteresis of the first transistor T1 included in each pixel P through the above data compensation. Accordingly, the momentary afterimage of the display device 600 due to the hysteresis of the first transistor T1 may be improved. However, since those have been described with reference to FIGS. 3 to 7, duplicate descriptions thereof will be omitted.

In another embodiment, the data compensation circuit 623 may include a reference frame data generating block which generates (i)th reference frame data based on (i−1)th reference frame data that is generated in an (i−1)th display frame (i.e., that is used in an (i)th display frame) and (i)th output image data OUTD that is generated based on the (i−1)th reference frame data in the (i)th display frame, a reference frame memory device which stores the (i)th reference frame data when the (i)th reference frame data is generated in the (i)th display frame and provides the (i)th reference frame data in an (i+1)th display frame, a memory control block which controls the reference frame memory device, and a compensating block which generates the (i)th output image data OUTD by generating (i)th conversion image data based on (i)th input image data IND that is input in the (i)th display frame, by generating afterimage compensation data for each pixel P based on the (i)th conversion image data and the (i−1)th reference frame data, and by compensating the (i)th input image data IND based on the afterimage compensation data. The data compensation circuit 623 may improve hysteresis of the first transistor T1 included in each pixel P through the above data compensation. Accordingly, the momentary afterimage of the display device 600 due to the hysteresis of the first transistor T1 may be improved. However, since those have been described with reference to FIGS. 8 to 9B, duplicate descriptions thereof will be omitted.

Figure 11:
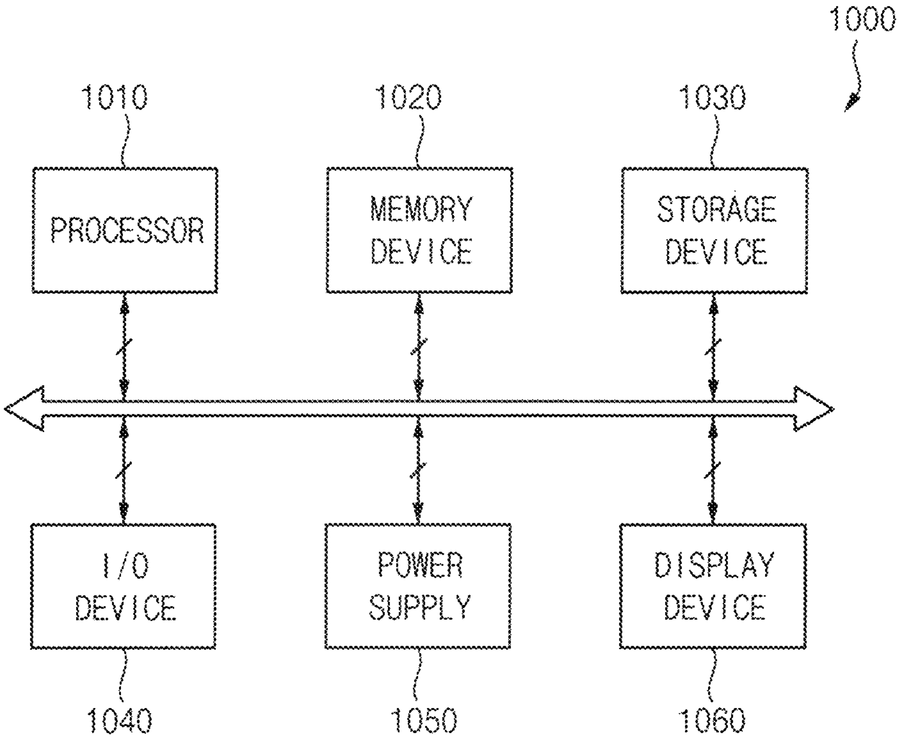
FIG. 11 is a block diagram illustrating an embodiment of an electronic device in the embodiments of the invention.
Figure 12:
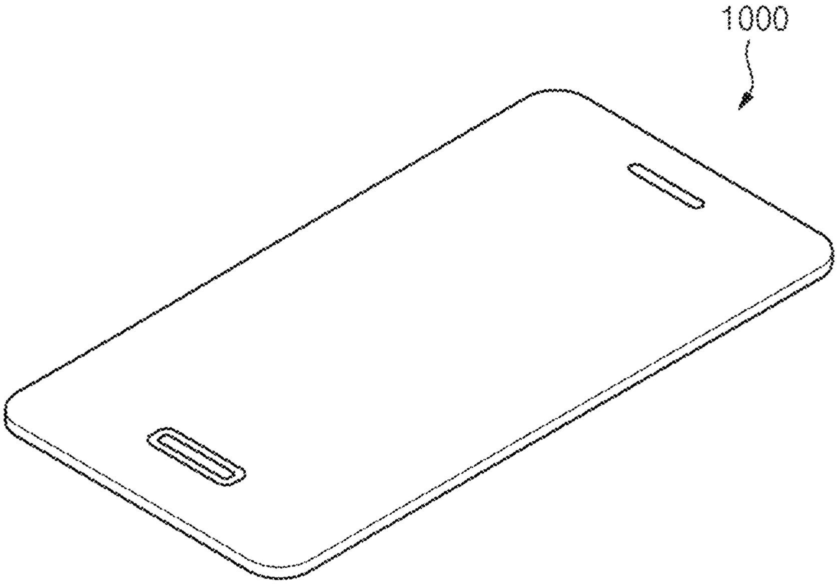
FIG. 12 is a diagram illustrating an example in which the electronic device of FIG. 11 is implemented as a smartphone.

FIG. 11 is a block diagram illustrating an embodiment of an electronic device according to the invention. FIG. 12 is a diagram illustrating an example in which the electronic device of FIG. 11 is implemented as a smart phone.

Referring to FIGS. 11 and 12, the electronic device 1000 may include a processor 1010, a memory device 1020, a storage device 1030, an input/output ("I/O") device 1040, a power supply 1050, and a display device 1060. In an embodiment, the electronic device 1000 may further include a plurality of ports for communicating with a video card, a sound card, a memory card, a universal serial bus ("USB") device, other electronic device, and the like, for example. In an embodiment, as illustrated in FIG. 12, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head mounted display ("HMD") device, and the like, for example.

The processor 1010 may perform various computing functions. In an embodiment, the processor 1010 may be a microprocessor, a central processing unit ("CPU"), an application processor ("AP"), and the like, for example. The processor 1010 may be coupled to other components via an address bus, a control bus, a data bus, and the like. Further, the processor 1010 may be coupled to an extended bus such as a peripheral component interconnection ("PCI") bus. The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like, for example. In an embodiment, the storage device 1030 may include a solid state drive ("SSD") device, a hard disk drive ("HDD") device, a CD-ROM device, and the like, for example. In an embodiment, the I/O device 1040 may include an input device such as a keyboard, a keypad, a mouse device, a touch-pad, a touch-screen, and the like, and an output device such as a printer, a speaker, and the like, for example. In some embodiments, the I/O device 1040 may include the display device 1060. The power supply 1050 may provide power for operations of the electronic device 1000.

The display device 1060 may display an image corresponding to visual information of the electronic device 1000. The display device 1060 may include a display panel including a plurality of pixels, a data driving circuit (or data driver) for providing a data signal to the display panel, a scan driving circuit (or scan driver) for providing a scan signal to the display panel, a data compensation circuit for compensating input image data to generate output image data corresponding to the data signal and a timing control circuit (or timing controller) for controlling the data driving circuit, the scan driving circuit, and the data compensation circuit.

In an embodiment, the data compensation circuit may include a reference frame memory device for storing reference frame data, an accumulated stress memory device for storing cumulative stress data for each pixel, a stress data generating block for comparing output image data with the reference frame data to generate stress data for each pixel, a memory control block for adding the stress data to the cumulative stress data to update the cumulative stress data and a compensating block for generating the output image data by generating afterimage compensation data for each pixel based on the cumulative stress data and compensating the input image data based on the afterimage compensation data. In another embodiment, the data compensation circuit may include a reference frame data generating block which generates (i)th reference frame data based on (i−1)th reference frame data that is generated in an (i−1)th display frame (i.e., that is used in an (i)th display frame) and (i)th output image data that is generated based on the (i−1)th reference frame data in the (i)th display frame, a reference frame memory device which stores the (i)th reference frame data when the (i)th reference frame data is generated in the (i)th display frame and provides the (i)th reference frame data in an (i+1)th display frame, a memory control block which controls the reference frame memory device, and a compensating block which generates the (i)th output image data by generating (i)th conversion image data based on (i)th input image data that is input in the (i)th display frame, by generating afterimage compensation data for each pixel based on the (i)th conversion image data and the (i−1)th reference frame data, and by compensating the (i)th input image data based on the afterimage compensation data. The display device 1060 in the embodiments of the invention may include the data compensation circuits, so that the hysteresis of the first transistor included in each pixel may be improved, and accordingly, the momentary afterimage of the display device 1060 due to the hysteresis of the first transistor may be improved. However, since these are described above, duplicated description related thereto will not be repeated.

The present invention may be applied to a display device and an electronic device including the display device. For example, the present invention may be applied to a cellular phone, a smart phone, a video phone, a smart pad, a smart watch, a tablet PC, a car navigation system, a television, a computer monitor, a laptop, a head mounted display (HMD) device, an MP3 player, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the predetermined embodiments disclosed, and that modifications to the disclosed embodiments, as well as other embodiments can be made.

What is claimed is:

1. A data compensation circuit for pixels, the data compensation circuit comprising:

a reference frame memory device which stores reference frame data;

an accumulated stress memory device which stores cumulative stress data for each of the pixels;

a stress data generating block which compares output image data with the reference frame data and generates stress data for each of the pixels;

a memory control block which adds the stress data to the cumulative stress data and updates the cumulative stress data; and a compensating block which generates the output image data by generating afterimage compensation data for each of the pixels based on the cumulative stress data and compensates input image data based on the afterimage compensation data, wherein the cumulative stress data for the each of the pixels is generated in consideration of any combination of various conditions including time, luminance, and current, wherein the reference frame data is obtained from a start frame data of an input image and wherein the compensating block is configured to selectively update the reference frame data, wherein the stress data generating block generates the stress data by calculating a stress for each of the pixels based on a difference between a first gray scale value according to the output image data and a reference gray scale value according to the reference frame data, and wherein the stress data has a maximum value when the first gray scale value and the reference gray scale value have values equal to each other, and is decreases as the difference between the first gray scale value and the reference gray scale value is increased.

2. The data compensation circuit of claim 1, wherein the stress data is calculated by Equation 1:

$$SD=A1*[(-\text{MaxStress}/\text{ZeroSt}X)*A0*DDO+\text{MaxStress}],$$

wherein SD represents the stress data, AO and Al represent stress correction factors, DDO represents the difference between the first gray scale value and the reference gray scale value, MaxStress represents a maximum value of the stress, and ZeroStX represents a value of the DDO when the stress is 0.

3. The data compensation circuit of claim 1, wherein the cumulative stress data is increased in proportion to a time duration during which the difference between the first gray scale value and the reference gray scale value is maintained.

4. The data compensation circuit of claim 3, wherein the compensating block determines a luminance compensation amount of the afterimage compensation data based on the cumulative stress data and a difference between the reference gray scale value and a second gray scale value according to the input image data.

5. The data compensation circuit of claim 4, wherein, when the second gray scale value is greater than the reference gray scale value, the compensating block generates the afterimage compensation data which performs a compensation of decreasing a luminance of the input image data.

6. The data compensation circuit of claim 4, wherein, when the second gray scale value is smaller than the reference gray scale value, the compensating block generates the afterimage compensation data which performs a compensation of increasing a luminance of the input image data.

7. The data compensation circuit of claim 4, wherein, when a size of the luminance compensation amount of the afterimage compensation data becomes 0, the compensating block updates the reference frame data as the input image data.

8. The data compensation circuit of claim 4, wherein the stress data generating block calculates a luminance correction constant by reflecting luminance data of the input image data, and generates luminance correction stress data based on the luminance correction constant.

9. A display device comprising:

a display panel including pixels;

a data driving circuit which provides a data signal to the display panel;

a scan driving circuit which provides a scan signal to the display panel;

a data compensation circuit which compensates input image data and generates output image data corresponding to the data signal, the data compensation circuit including:

a reference frame memory device which stores reference frame data;

an accumulated stress memory device which stores cumulative stress data for each of the pixels;

a stress data generating block which compares output image data with the reference frame data and generates stress data for each of the pixels;

a memory control block which adds the stress data to the cumulative stress data and updates the cumulative stress data; and a compensating block which generates the output image data by generating afterimage compensation data for each of the pixels based on the cumulative stress data and compensating the input image data based on the afterimage compensation data; and a timing control circuit which controls the data driving circuit, the scan driving circuit, and the data compensation circuit, wherein the cumulative stress data for the each of the pixels is generated in consideration of any combination of various conditions including time, luminance, and current, wherein the reference frame data is obtained from a start frame data of an input image and wherein the compensating block is configured to selectively update the reference frame data, wherein the stress data generating block generates the stress data by calculating a stress for each of the pixels based on a difference between a first gray scale value according to the output image data and a reference gray scale value according to the reference frame data, and wherein the stress data has a maximum value when the first gray scale value and the reference gray scale value have values equal to each other, and is decreases as the difference between the first gray scale value and the reference gray scale value is increased.

10. The display device of claim 9, wherein the cumulative stress data is increased in proportion to a time duration during which the difference between the first gray scale value and the reference gray scale value is maintained.

11. The display device of claim 10, wherein the compensating block determines a luminance compensation amount of the afterimage compensation data based on the cumulative stress data and a difference between the reference gray scale value and a second gray scale value according to the input image data.

12. The display device of claim 11, wherein, when a size of the luminance compensation amount of the afterimage compensation data becomes 0, the compensating block updates the reference frame data as the input image data.

13. The display device of claim 11, wherein the stress data generating block calculates a luminance correction constant by reflecting luminance data of the input image data, and generates luminance correction stress data based on the luminance correction constant.

14. A method of compensating data, the method comprising:

storing reference frame data;

storing cumulative stress data for each of pixels;

comparing output image data with the reference frame data;

generating stress data for each of the pixels;

adding the stress data to the cumulative stress data;

updating the cumulative stress data;

generating afterimage compensation data for each of the pixels based on the cumulative stress data;

selectively updating the reference frame data based on the afterimage compensation data; and generating the output image data by compensating a luminance of input image data based on the afterimage compensation data, wherein the cumulative stress data for the each of the pixels is generated in consideration of any combination of various conditions including time, luminance, and current, wherein the reference frame data is obtained from a start frame data of an input image, wherein the stress data generating includes calculating a stress for each of the pixels based on a difference between a first gray scale value according to the output image data and a reference gray scale value according to the reference frame data, and wherein the stress data has a maximum value when the first gray scale value and the reference gray scale value have values equal to each other, and is decreases as the difference between the first gray scale value and the reference gray scale value is increased.

15. The method of claim 14, wherein the generating the afterimage compensation data includes:

determining a luminance compensation amount of the afterimage compensation data based on the cumulative stress data and a difference between the reference gray scale value and the second gray scale value according to the input image data; and updating the reference frame data as the input image data when a size of the luminance compensation amount of the afterimage compensation data becomes 0.

* * * * *